(12) United States Patent
Minami et al.

(10) Patent No.: US 11,967,013 B2
(45) Date of Patent: Apr. 23, 2024

(54) IMAGE PROCESSING METHOD AND IMAGE PROCESSING APPARATUS THAT APPLY SELECTED TEXTURE DATA TO A TARGET REGION

(71) Applicant: CANON KABUSHIKI KAISHA, Tokyo (JP)

(72) Inventors: Yoshitaka Minami, Kanagawa (JP); Hiroyasu Kunieda, Kanagawa (JP); Hideki Kubo, Kanagawa (JP); Takeru Sasaki, Kanagawa (JP); Kazuya Ogasawara, Kanagawa (JP); Masao Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 17/875,654

(22) Filed: Jul. 28, 2022

(65) Prior Publication Data
US 2023/0032061 A1    Feb. 2, 2023

(30) Foreign Application Priority Data

Aug. 2, 2021 (JP) .................. 2021-126880

(51) Int. Cl.
G06T 15/04    (2011.01)
G06T 11/00    (2006.01)
G06T 15/50    (2011.01)

(52) U.S. Cl.
CPC ............ *G06T 15/04* (2013.01); *G06T 11/001* (2013.01); *G06T 15/50* (2013.01)

(58) Field of Classification Search
CPC .................................................. G06T 15/04
See application file for complete search history.

(56) References Cited

U.S. PATENT DOCUMENTS

| 2014/0125659 A1* | 5/2014 | Yoshida ............ H04N 1/00442 345/589 |
| 2019/0158688 A1* | 5/2019 | Murasawa ......... H04N 1/00442 |
| 2020/0274985 A1* | 8/2020 | Yanai .................... H04N 1/233 |

FOREIGN PATENT DOCUMENTS

JP    2009093287 A    4/2009

OTHER PUBLICATIONS

Isamu Motoyoshi et al., "Image statistics and the perception of surface qualities," Nature, vol. 447, May 10, 2007, pp. 206 to 209 (4 pages).

* cited by examiner

*Primary Examiner* — Shivang I Patel
(74) *Attorney, Agent, or Firm* — Venable LLP

(57) ABSTRACT

An image processing method of holding a plurality of texture data for applying a metal representation on an image. The method includes acquiring predetermined information concerning at least one of an observation distance as a distance between a print product on which a target region is printed and an observer observing the print product, a sheet on which the target region is printed, or an environment in which the print product is observed, selecting texture data from the plurality of texture data based on the acquired predetermined information, and applying, to the target region, the texture data selected in the selecting.

24 Claims, 13 Drawing Sheets

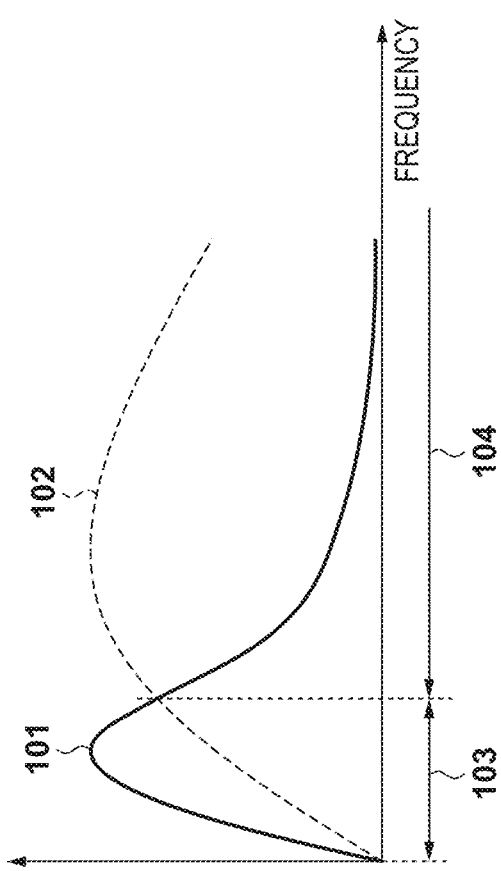
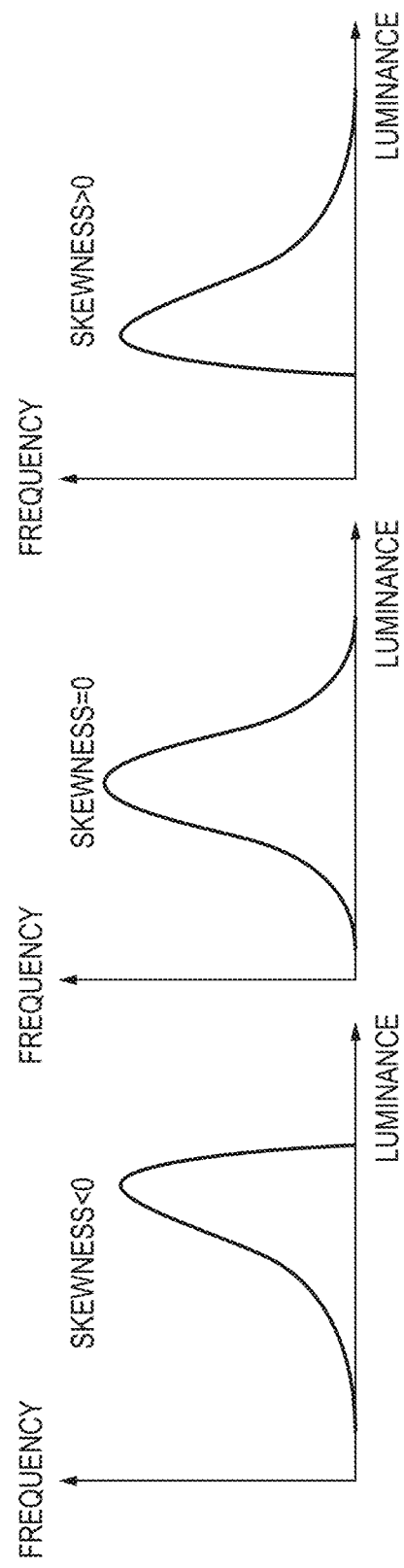

701
| TEXTURE DATA 1-1 |
| TEXTURE DATA 1-2 |
| TEXTURE DATA 1-3 |
| TEXTURE DATA 1-4 |
| ⋮ |

702
| TEXTURE DATA 2-1 |
| TEXTURE DATA 2-2 |
| TEXTURE DATA 2-3 |
| TEXTURE DATA 2-4 |
| ⋮ |

703
| TEXTURE DATA 3-1 |
| TEXTURE DATA 3-2 |
| TEXTURE DATA 3-3 |
| TEXTURE DATA 3-4 |
| ⋮ |

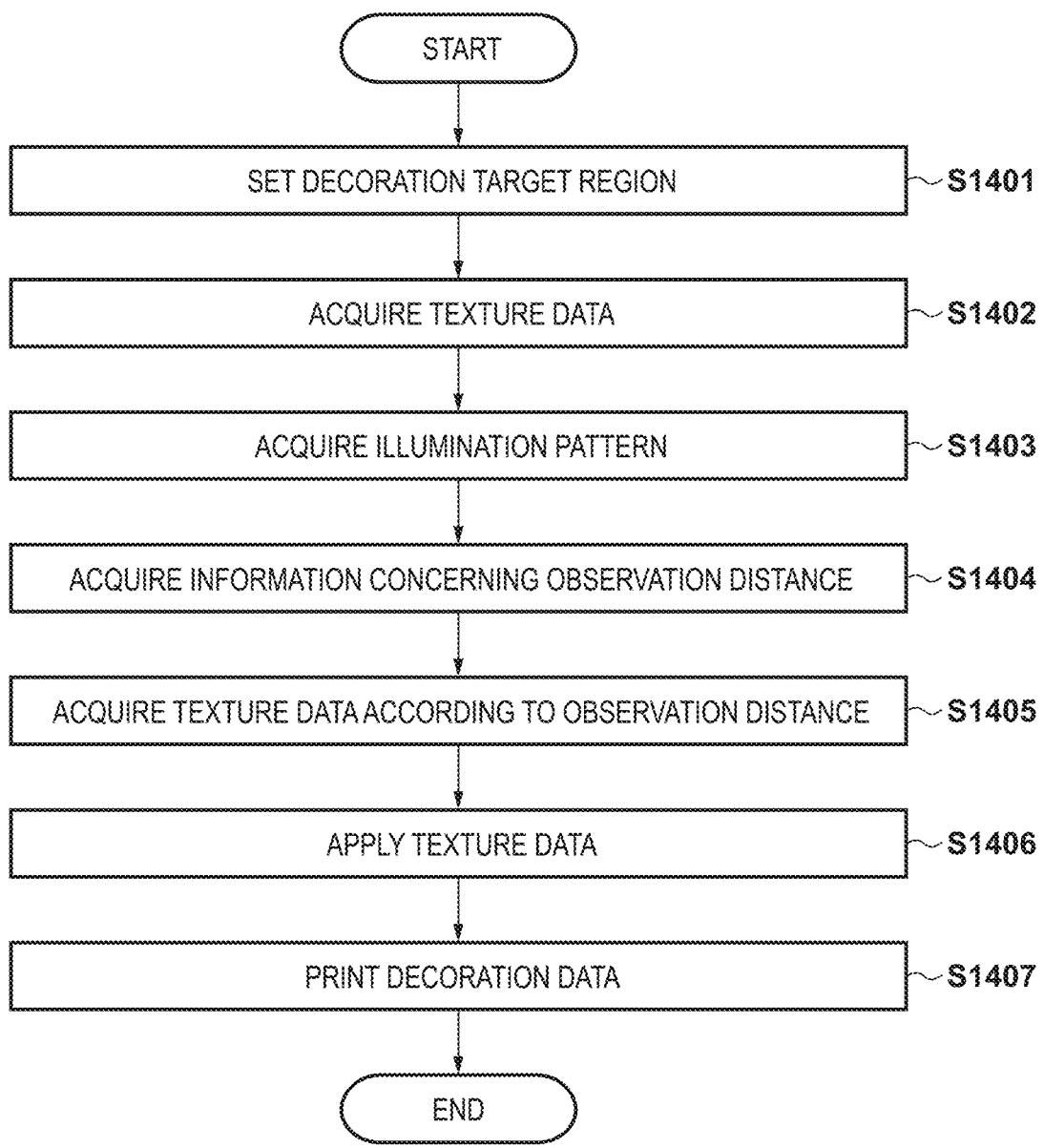

ILLUMINATION PATTERN :

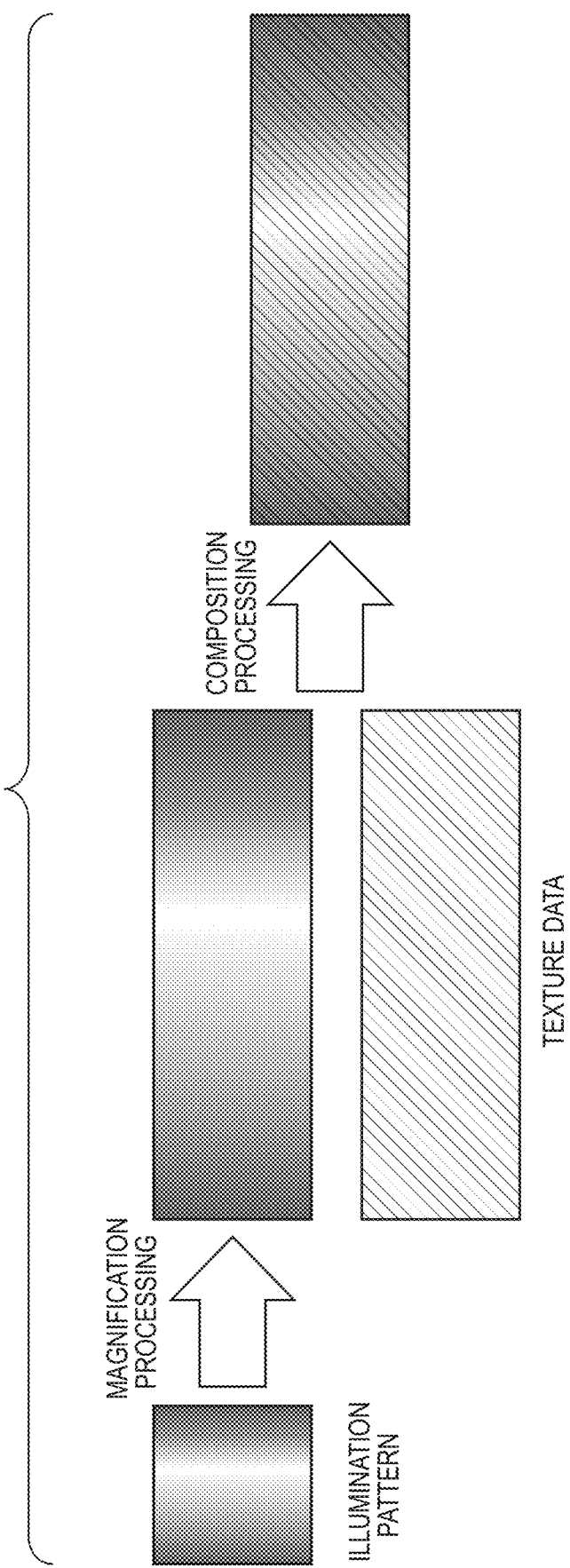

IMAGE PROCESSING METHOD AND IMAGE PROCESSING APPARATUS THAT APPLY SELECTED TEXTURE DATA TO A TARGET REGION

Cross Reference to Priority Application

This application claims the benefit of Japanese Patent Application No. 2021-126880, filed Aug. 2, 2021, which is hereby incorporated by reference herein in its entirety.

BACKGROUND OF THE INVENTION

Field of the Invention

The present invention relates to an image processing method and an image processing apparatus.

Description of the Related Art

There is known a decoration technique of adding metal texture by adding texture data to an object to be decorated on digital data. In a decoration technique disclosed in Japanese Patent Laid-Open No. 2009-93287, information concerning a light source in a location where data decorated by texture data is observed is acquired first. Then, data having realistic texture is generated by performing, for the texture data, correction of faithfully reproducing metal reflection caused under the acquired light source.

However, the above conventional technique does not consider an observation distance when observing decorated data. FIG. 1 is a graph showing the frequency response characteristic of human vision in which the abscissa represents a frequency and the ordinate represents a contrast sensitivity. The frequency response characteristic of vision indicates the sensitivity characteristic representing a contrast visually recognized by a person at a given frequency. In the frequency response characteristic of vision, it is known that if the observation distance changes, the peak frequency of the contrast sensitivity changes. Referring to FIG. 1, a solid line 101 and a broken line 102 represent the visual characteristics at different observation distances L1 and L2 (L1<L2), respectively. When comparing the contrasts respectively perceived at the two observation distances, the solid line 101>the broken line 102 is obtained in a target region having a low-frequency domain 103. The contrast when performing observation at the observation distance L1 is perceived more strongly than the contrast when performing observation at the observation distance L2. On the other hand, the solid line 101<the broken line 102 is obtained in a target region having a high-frequency domain 104. Therefore, the contrast when performing observation at the observation distance L2 is perceived more strongly than the contrast when performing observation at the observation distance L1. In this way, a problem that metal texture obtained by performing decoration is perceived differently depending on the observation distance arises.

SUMMARY OF THE INVENTION

The present invention provides a technique of suppressing deterioration in decoration effect by switching and using texture data to be used in accordance with the observation distance of decorated data.

According to an aspect, the present invention, provides an image processing method of holding a plurality of texture data for applying a metal representation on an image, comprising acquiring predetermined information concerning at least one of an observation distance as a distance between a print product on which a target region is printed and an observer observing the print product, a sheet on which the target region is printed, or an environment in which the print product is observed, selecting texture data from the plurality of texture data based on the acquired predetermined information, and applying, to the target region, the texture data selected in the selecting.

Further features of the present invention will become apparent from the following description of exemplary embodiments (with reference to the attached drawings).

BRIEF DESCRIPTION OF THE DRAWINGS

FIG. 1 is a graph for explaining the frequency response characteristic of vision;

FIGS. 2A to 2C are graphs for explaining the skewness of a histogram;

FIG. 14 is a flowchart for explaining processing executed by an image processing apparatus 30 according to the second embodiment;

FIG. 16 is a view for explaining an outline of the processing in step S1503;

DESCRIPTION OF THE EMBODIMENTS

Figure 3A:
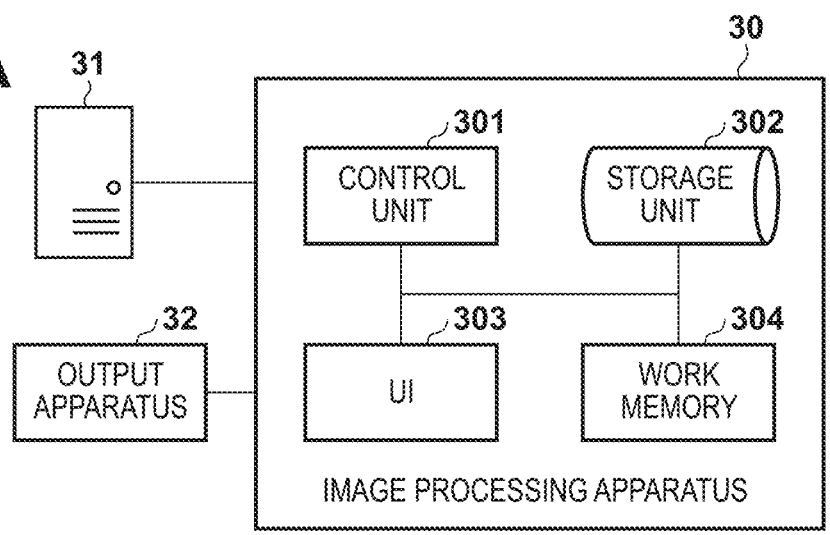
FIG. 3A is a view showing the configuration of an image processing system to which an image processing apparatus according to the first embodiment of the present invention is applied.

Hereafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The first embodiment will describe an example of creating decoration data that reproduces metal texture by adding texture data to a decoration region to which a metal representation is to be applied, and observing printed decoration data. An image processing apparatus according to the first embodiment sets a decoration region to which a metal representation is to be applied, and acquires at least two or more texture data as candidates to be added to the decoration region. Next, the image processing apparatus acquires predetermined information concerning the distance between printed decoration data and an observer who observes the printed decoration data, that is, an observation distance. Furthermore, the image processing apparatus selects such texture data that the skewness of a perceived image at the observation distance (to be described later) is high from the plurality of acquired texture data based on the acquired predetermined information concerning the observation distance, and uses it for decoration processing. Then, the image processing apparatus prints the obtained decoration data by an output apparatus. An arrangement and processing according to the first embodiment will be described below with reference to FIGS. 2A to 11B.

First, an image statistic having a correlation with the quality of metal texture in the first embodiment will be described with reference to FIGS. 2A to 2C.

An example of the characteristics of a metal substance is a strong metallic luster generated when free electrons in the substance and the electromagnetic wave of illumination light generate plasmon resonance. When a person perceives a metal texture, perception of a metallic luster (a metallic luster feeling) is important.

Perception of a metal texture by using a perception of luster is the same as in perception of texture of a substance projected on a two-dimensional image. The brain of a person can perceive the metal texture of a substance projected on an image by using, as a key, a statistic in the image having a high correlation with the above-described luster feeling. In recent years, a research result that the skewness of a luminance histogram contributes to the apparent luster feeling of a substance in an image has been reported. The skewness is a statistic representing the unevenness of the histogram in the image, and is calculated using a pixel count n in the image, pixel values xi (i=1, 2, . . . n), the average value x(-) of the pixel values, and a standard deviation s, given by:

$$\text{skewness} = \{n/(n-1)(n-2)\} \times \Sigma\{((xi-x(-))/s)^3\} \quad (1)$$

Note that Σ represents the sum of values for i from 1 to n.

In the case of a bilaterally symmetric distribution, that is, a normal distribution, as shown in FIG. 2B, the skewness is 0. To the contrary, in the case of a distribution that is long on the left side, as shown in FIG. 2A, the skewness is a negative value. In the case of a distribution that is long on the right side, as shown in FIG. 2C, the skewness is a positive value. In Isamu Motoyoshi, et al., "Image statistics and the perception of surface qualities" Nature 447.7141 (2007): 206-209, it is described that as the skewness of a luminance histogram in an image is a greater positive value (FIG. 2C), a higher apparent luster feeling is perceived.

As described above, the luster feeling of the substance is a very important factor in perceiving a metal texture. That is, the use of such texture data that the skewness of the luminance histogram in the image is a greater positive value improves the apparent luster feeling, that is, the metal texture to be perceived.

FIG. 3A is a view showing the configuration of an image processing system to which an image processing apparatus 30 according to the first embodiment of the present invention is applied. As shown in FIG. 3A, the image processing apparatus 30 according to the first embodiment is connected to a data server 31 and an output apparatus 32.

The data server 31 holds texture data to be used by the user to perform decoration processing of reproducing metal texture. This texture data is input from the data server 31 to the image processing apparatus 30.

The image processing apparatus 30 acquires data from the data server 31, and then sends a control instruction to the output apparatus 32 and transfers necessary information and data. An operating system (OS) as well as a system program according to this embodiment, various application software programs, and parameter data necessary for various processes are stored and managed in a storage unit 302. This storage unit 302 can be formed by a storage device represented by a hard disk or a flash ROM. A control unit 301 includes a CPU (Central Processing Unit) 310 (FIG. 3B), and comprehensively controls processing in the image processing apparatus 30 by loading software stored in the storage unit 302 into a work memory 304 such as a RAM, and executing it. Note that the hardware arrangement and functional arrangement of the control unit 301 will be described later with reference to FIGS. 3B and 4, respectively. An operation unit (to also be referred to as a "UI" hereafter) 303 serving as a user interface performs processing associated with user input or display to a user with respect to execution of the processing in the image processing apparatus 30, and includes an input device such as a keyboard and a pointing device and a display device, such as a display.

The output apparatus 32 is, for example, a print apparatus such as an inkjet printer, and includes a data transfer unit, a printer control unit, and a print unit. The output apparatus 32 prints, by the inkjet printing method, decoration data acquired from the image processing apparatus 30. In this embodiment, a case in which the output apparatus 32 is an inkjet printer will be described, but the output apparatus 32 may be an electrophotographic printer. Alternatively, the output apparatus 32 may be a display or a projector.

Figure 3B:
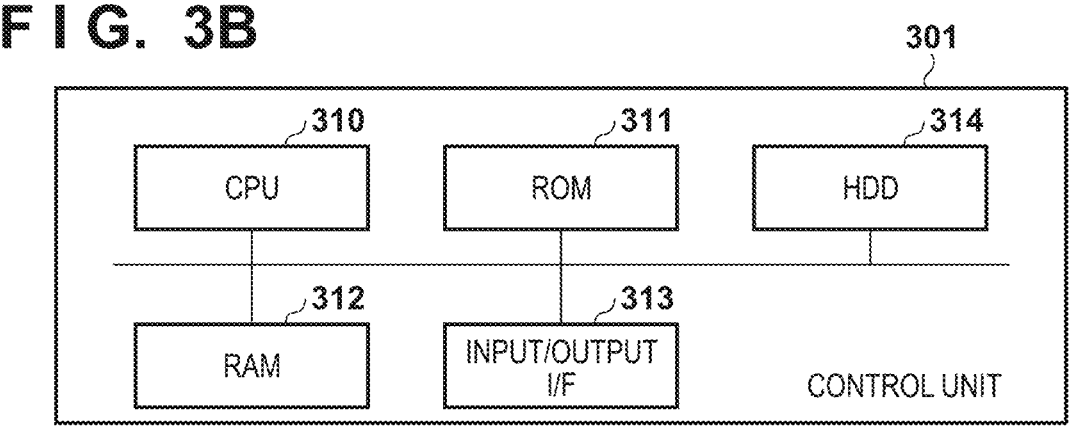
FIG. 3B is a block diagram for explaining the hardware arrangement of a control unit of the image processing apparatus.

FIG. 3B is a block diagram for explaining the hardware arrangement of the control unit 301 of the image processing apparatus 30 according to the embodiment.

The CPU 310 controls control processing by the control unit 301 by executing a program loaded into a RAM 312 corresponding to the above-described work memory 304. A ROM 311 stores programs, various data, and the like. The RAM 312 provides a work area that stores various data, and the like, at the time of the operation of the CPU 310, and is also used as a program loading area. An input/output interface (I/F) 313 controls an interface between the control unit 301 and the UI 303 or a network. An HDD (Hard Disk Drive) 314 also functions as the storage unit 302 shown in FIG. 3A, and stores programs and various data.

Figure 4:
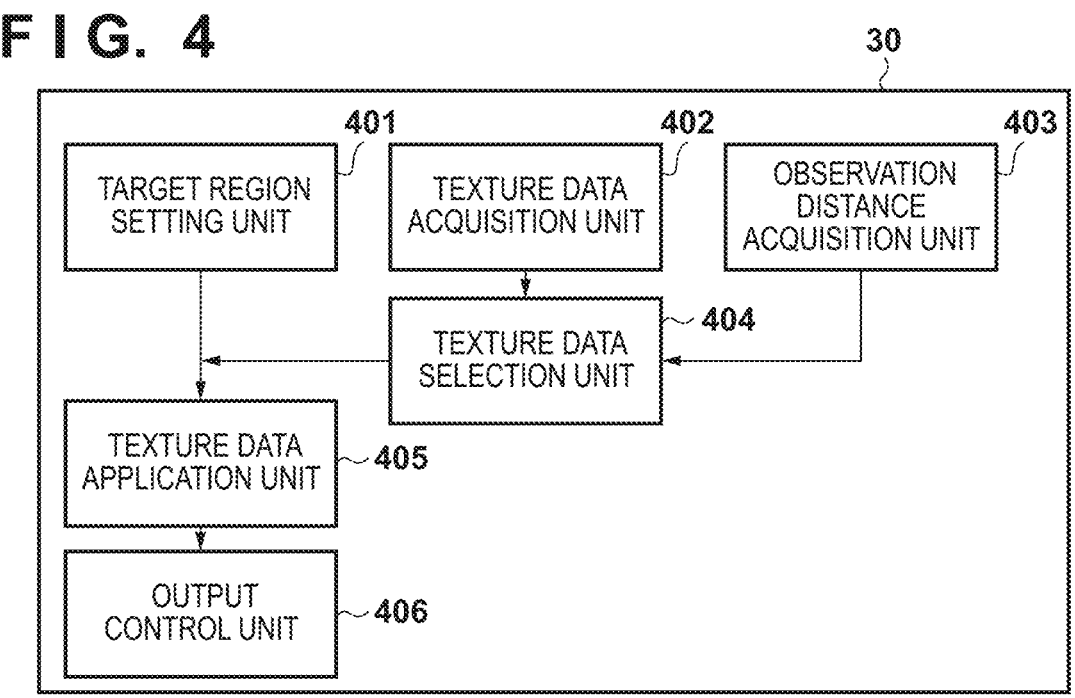
FIG. 4 is a functional block diagram for explaining the functions of the image processing apparatus according to the first embodiment.

FIG. 4 is a functional block diagram for explaining the functions of the image processing apparatus 30 according to the first embodiment. Note that each function shown in FIG. 4 is implemented when the above-described CPU 310 loads software stored in the storage unit 302 into the work memory 304 (RAM 312) and executes it.

A target region setting unit 401 sets a region to which decoration processing of reproducing metal texture is applied. A texture data acquisition unit 402 acquires texture data input from the data server 31 to the image processing apparatus 30. An observation distance acquisition unit 403 acquires information (to sometimes simply be referred to as an "observation distance" here after) concerning an observation distance when observing decoration data applied with the decoration processing. A texture data selection unit 404 selects, based on the observation distance acquired by the observation distance acquisition unit 403, texture data to be used for the decoration processing from the texture data acquired by the texture data acquisition unit 402. A texture data application unit 405 creates decoration data by arranging the texture data selected by the texture data selection unit 404 in the region set by the target region setting unit 401. An output control unit 406 performs output control of causing the output apparatus 32 to output the thus created decoration data. Note that, in this example, these functions are implemented when the CPU 310 executes the programs, but some or all of the functions of the components of the functional blocks may be implemented by using dedicated circuits. Alternatively, some or all of the functions of the components of the functional blocks may be implemented by using a cloud computer.

Figure 5:
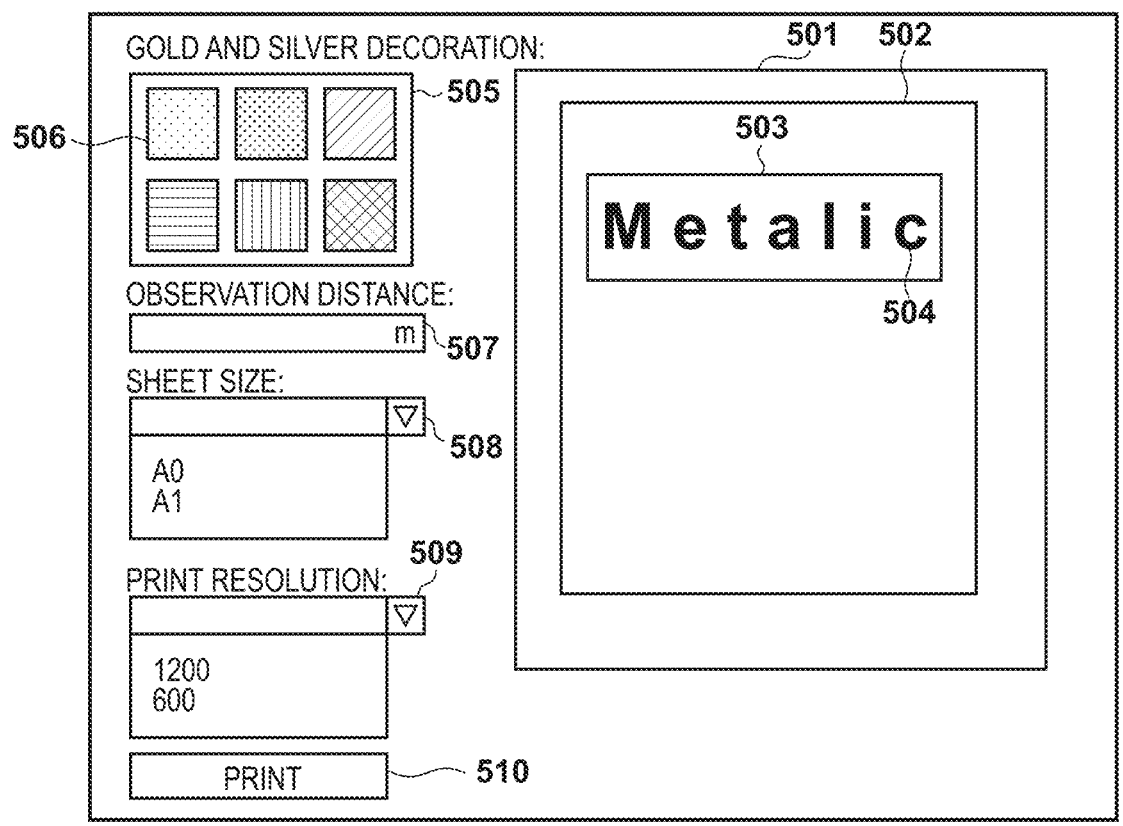
FIG. 5 is a view showing an example of a user interface (UI) screen when creating decoration data in a UI of the image processing apparatus according to the first embodiment.

FIG. 5 is a view showing an example of a UI screen when creating decoration data in the UI 303 of the image processing apparatus 30 according to the first embodiment.

The UI 303 according to the first embodiment includes a texture pattern display region 505 where texture patterns 506 selectable by the user are displayed and an edit data display region 501 where decoration data 502 is displayed. The user designates an application object 503, in the decoration data 502, to which gold and silver decoration is to be applied. Then, the desired texture pattern 506 can be selected from the texture pattern display region 505, and the selected texture pattern can be applied to a decoration target region 504 in the application object 503, thereby performing metal decoration. Furthermore, the UI 303 includes an observation distance input box 507 to observe printed decoration data.

Furthermore, the UI 303 includes a dropdown list 508 for selecting a sheet size and a dropdown list 509 for selecting a print resolution, which are used to make print settings. Then, when a print button 510 is pressed, print processing of the decoration data 502 starts based on the print settings set in this screen. Note that the UI shown in FIG. 5 is merely an example, and the UI according to the embodiment is not limited to this.

Figure 6:
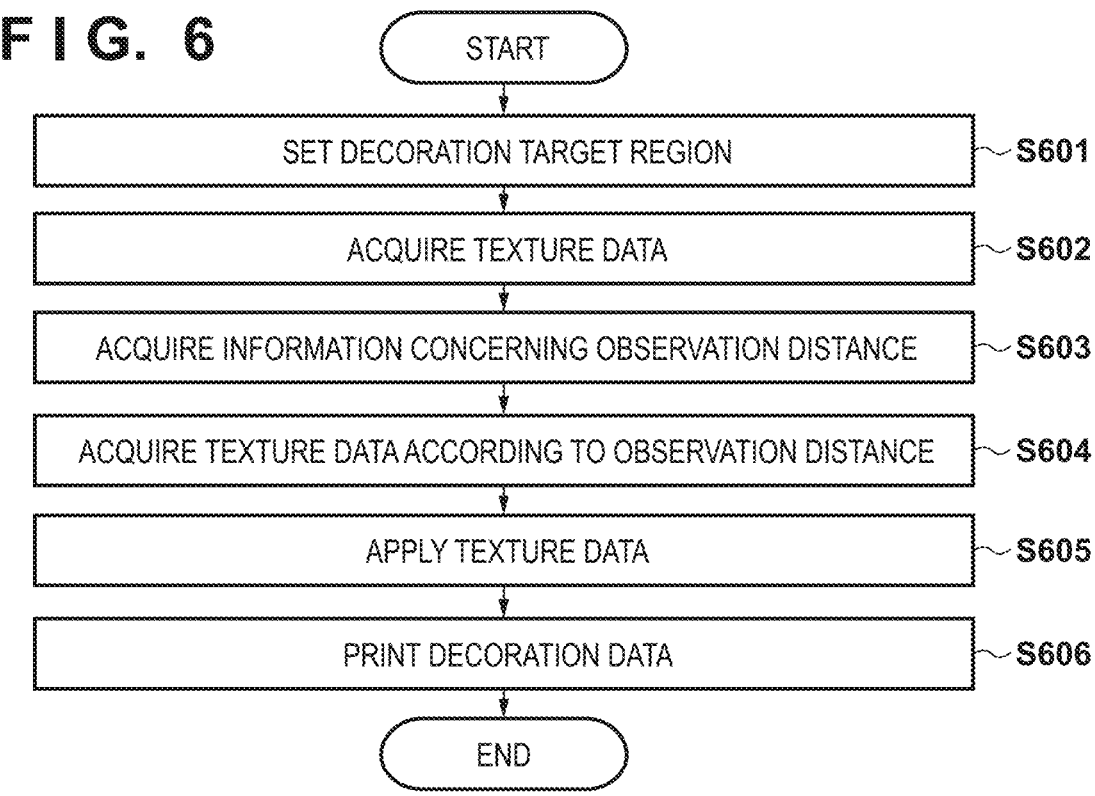
FIG. 6 is a flowchart for explaining processing executed by the image processing apparatus according to the first embodiment.

FIG. 6 is a flowchart for explaining processing executed by the image processing apparatus 30 according to the first embodiment. Note that the embodiment describes an example in which the image processing apparatus 30 is outside the output apparatus 32 but the image processing apparatus 30 may be included in the output apparatus 32. The processing illustrated by this flowchart is achieved when the CPU 310 executes a program loaded into the RAM 312.

In step S601, the CPU 310 functions as the target region setting unit 401 to set a decoration target region (for example, 503 of FIG. 5) to which the texture data is to be applied and output it to the texture data application unit 405. Note that an example of the decoration target region setting method is a method of setting, as an application object, an object designated by the user on the UI 303, and setting text in the application object 503 as the decoration target region 504, as shown in FIG. 5. Note that the application object or the decoration target region need not be a text object, and may be, for example, a graphic object such as a circle or rhombus. Alternatively, a clip art such as a metal or a trophy may be possible. Instead of designating an object, the user may designate two points of the start point of a rectangle and its end point as a diagonal point on the decoration data, thereby setting a rectangular region surrounding the two points as the decoration target region. For example, the background surface of the decoration data may be set as the decoration target region. FIG. 5 shows an example of designating only one point of the application object 503 as an application object, but a plurality of objects may be designated.

The decoration target region may automatically be set instead of being set by the user. For example, when a gold and silver automatic decoration button (not shown) is pressed, a text region having a largest font size in the decoration data may automatically be set as the decoration target region. Alternatively, a region having high attractivity in the decoration data, detected by a known conspicuity detection technique, may be set as the decoration target region. This can create gold and silver decoration data by omitting the user's labor of selecting the decoration region. Even a user inexperience in design can effectively perform gold and silver decoration processing.

Next, the process advances to step S602 and the CPU 310 functions as the texture data acquisition unit 402 to acquire at least two or more texture data input from the data server 31 to the image processing apparatus 30. Then, the acquired texture data are output to the texture data selection unit 404. The texture data are not limited to the texture patterns displayed in the texture pattern display region 505.

Figure 7A:
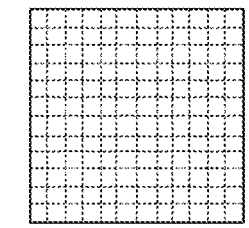
FIGS. 7A to 7C are views for explaining texture pattern lists held in a data server in correspondence with a texture pattern display region shown in FIG. 5.
Figure 7B:
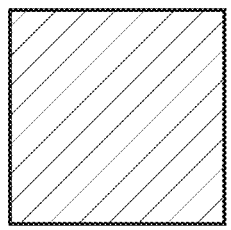
Figure 7C:
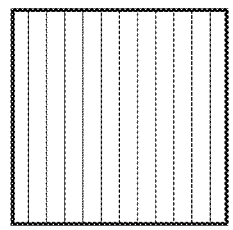

FIGS. 7A to 7C are views for explaining texture pattern lists held in the data server 31 in correspondence with the texture pattern display region 505 shown in FIG. 5.

For example, as shown in FIGS. 7A to 7C, texture pattern lists 701 to 703 respectively associated with the texture patterns displayed in the texture pattern display region 505 shown in FIG. 5 are held in the data server 31. Then, in step S602, a plurality of texture data linked with the texture pattern selected by the user from the texture pattern display region 505 may be acquired. In the embodiment, the texture data are acquired directly from the data server 31. However, these texture pattern lists may be saved in the storage unit 302 of the image processing apparatus 30 and then texture data may be acquired from the storage unit 302.

Next, the process advances to step S603, and the CPU 310 functions as the observation distance acquisition unit 403 to acquire information concerning an observation distance at which the decoration data is observed and output it to the texture data selection unit 404. With respect to this observation distance, for example, the information concerning the observation distance can be acquired based on a numerical value input by the user via the observation distance input box 507 shown in FIG. 5. Instead of acquiring the information concerning the observation distance based on the numerical value input by the user, for example, as shown in FIG. 7D, a dropdown list button 710 displaying items each for selecting an observation condition may be provided in the UI 303 and information concerning a corresponding observation distance may be acquired based on the item selected by the user.

Figure 7D:
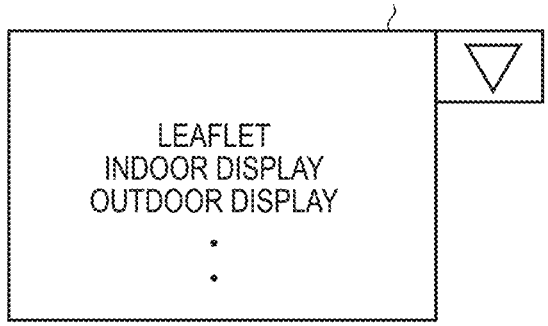
FIG. 7D is a view showing an example of a dropdown list button displaying items each for selecting an observation condition.

FIG. 7D is a view showing an example of the dropdown list button for selecting an observation condition, which is displayed on the UI 303 of the image processing apparatus 30 according to the first embodiment.

In this case, the information concerning the observation distance is acquired based on the correspondences between observation distances and observation conditions held in advance in the storage unit 302. For example, the observation distance may be set stepwise. For example, the observation distance is 30 cm for an observation condition of "leaflet", is 1 m for an observation condition of "indoor display", and is 3 m for an observation condition of "outdoor display". Furthermore, it is generally known that a print sheet size and a distance (environment) at which a print product is observed are related to each other, and the observation distance may be simply set without designating it directly by the user. In this case, the correspondences between print sheet sizes and observation distances are held in advance in the storage unit 302, and then the information concerning the observation distance is acquired based on the sheet size selected in the dropdown list 508 for selecting the print sheet size. For example, the length of the short or long side of the print sheet size may be acquired, and the correspondence between the sheet size and the observation distance may be decided so as to be proportional to the acquired length with reference to the length. An observation distance (for example, smaller than the A3 size) when observing a print product by holding it by a hand and an observation distance (for example, equal to or larger than the A3 size) when observing a print product by posting it on the wall may be set. Either case is possible as long as the information concerning the observation distance for the decoration data can be acquired. In this example, the form in which a value corresponding to the observation distance is finally acquired from the sheet size or the like input by the user has been explained. However, the present invention is not limited to this. That is, a form in which information indicating the sheet size or information indicating the length of the short or long side of the sheet size is acquired by accepting the user input but a value corresponding to the observation distance is not acquired based on the information may be possible. Note that, in this form, if the user inputs a sheet size, information indicating the length of the short or long side of the sheet size may be acquired based on the input sheet size. Then, when selecting texture data, as will be described below, the sheet size input by the user, the length of the short or long side of the sheet size input by the user, or the like, may be referred to, instead of the value corresponding to the observation distance. Note that in this embodiment, a custom size as a size arbitrarily decided by the user can be set as a sheet size. The image processing apparatus 30 acquires the custom size when the user decides/inputs the length of the short side and/or the long side of the size. On the other hand, in the case of a regular size such as the A4 size, a program that displays the UI 303 recognizes, in advance, the length of the short side and/or the long size of the size, and the image processing apparatus 30 thus acquires the information recognized by the program.

Next, the process advances to step S604, and the CPU 310 functions as the texture data selection unit 404 to simulate perceived luminance contrast data (to be described later) based on the information concerning the observation distance acquired by the observation distance acquisition unit 403 with respect to the plurality of texture data acquired by the texture data acquisition unit 402. The skewness of a luminance histogram in the thus simulated perceived luminance contrast data is calculated. Then, texture data presenting high skewness is selected from the plurality of texture data and the selected texture data is output to the texture data application unit 405.

The perceived luminance contrast data is data obtained by simulating luminance contrast data perceived by a person in consideration of the frequency response characteristic of vision.

First, the texture data is converted into luminance contrast data. If the input texture data is RGB data, it can be converted into YCbCr data using equations (2) to (4) below. The conversion formulas from RGB data into YCbCr data are merely examples and other conversion formulas may be used.

$$Y = 0.299 \cdot R30 \; 0.587 \cdot G + 0.114 \cdot B \tag{2}$$

$$Cb = -0.169 \cdot R - 0.331 \cdot G + 0.5 \cdot B \tag{3}$$

$$Cr = 0.5 \cdot R - 0.419 \cdot G - 0.081 \cdot B \tag{4}$$

Subsequently, a method of simulating the perceived luminance contrast data by applying, to the luminance contrast data, the frequency response characteristic of vision corresponding to the observation distance will be described.

As the frequency response characteristic (VTF) of vision, for example, the Dooley's approximation given by equation (5) below can be used.

$$VTF = 5.05 \times \exp(-0.138 \times \pi L f/180) \times (1 - \exp(-0.1 \times \pi L f/180)) \tag{5}$$

where L represents the observation distance [mm] and f represents the frequency [cycles/mm]. In step S604, the observation distance acquired in step S603 is used. The example of using the Dooley's approximation has been explained above but the frequency response characteristic of vision is not limited to this. Any sensitivity characteristic indicating a contrast visually recognized by a person in accordance with the frequency is possible.

Then, the luminance contrast data is converted into frequency data. Conversion into frequency data can be performed using a known technique such as FFT (Fast Fourier Transform). A frequency included in the data can be calculated based on the pixel count of the texture data and a size after printing. For example, the highest frequency f [cycles/mm] included in the texture data of a size s [mm] after printing can be calculated by equation (6) when n [pix] represents the pixel count of the texture data.

$$f = n/2s \quad (6)$$

Each frequency in the texture data calculated based on the pixel count of the texture data and the size after printing, as described above, is multiplied by the frequency response characteristic of vision. Then, by inversely converting the obtained frequency data into the luminance contrast data, the perceived luminance contrast data obtained by simulating the contrast perceived by a person can be calculated. Note that in the first embodiment, as an example, a case in which the texture data is a rectangle is assumed. However, the texture data is not always a rectangle. In this case, in conformance with the shape of the texture data, the frequency in the texture data may be calculated with reference to, for example, the width or the height. Alternatively, the frequency in the texture data may be calculated with reference to the average value of the height and the width.

Figure 8:
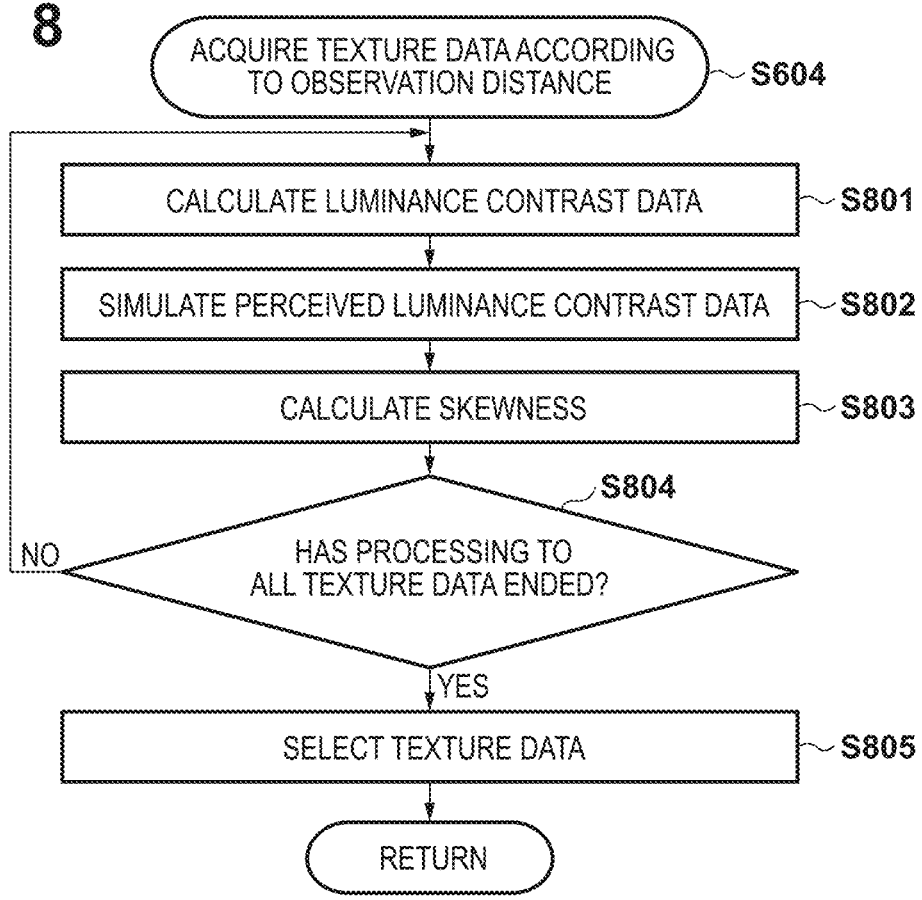
FIG. 8 is a flowchart for explaining details of processing of acquiring texture data in accordance with an observation distance in step S604 of FIG. 6.

FIG. 8 is a flowchart for explaining details of the processing in step S604 of FIG. 6.

In step S801, the CPU 310 calculates luminance contrast data using equations (2) to (4) with respect to the texture data acquired in step S602. The process advances to step S802 and the CPU 310 simulates the perceived luminance contrast data based on the observation distance acquired by the observation distance acquisition unit 403 with respect to the luminance contrast data calculated in step S801. The process advances to step S803 and the CPU 310 calculates skewness using equation (1) with respect to the perceived luminance contrast data calculated in step S802. The process advances to step S804 and the CPU 310 determines whether the processing has been applied to all the texture data acquired in step S602. If the processing has ended for all the texture data, the process advances to step S805. Otherwise, the process returns to step S801 to repeat the above-described processing. Then, in step S805, the CPU 310 selects the texture data to be used for gold and silver decoration processing based on the skewness calculated in step S803. At this time, for example, the texture data presenting the highest skewness calculated in step S803 may be selected.

In the texture data lists shown in FIGS. 7A to 7C, the texture data as a reference is decided in advance, and the texture data presenting the skewness higher than the skewness calculated from the reference texture data may be selected. An example of the reference texture data is the texture data selected by the user in the texture pattern display region 505. If the observation distance is changed after gold and silver decoration is applied, the texture data set before the observation distance is changed may be set as the reference texture data.

If a plurality of texture data are candidates, the texture data with average luminance closest to that of the reference texture data may be selected or the texture data with a hue or chroma closest to that of the reference texture data may be selected. That is, the texture data presenting the skewness higher than that calculated from the reference texture data need only be selected. As described above, by selecting the texture data presenting the high skewness on perceived data obtained by simulating the actual appearance, the texture data with high metal texture at the assumed observation distance can be selected.

The first embodiment has explained the example of executing steps S801 to S805 after the acquisition of the information concerning the observation distance in step S603, and selecting the texture data. The embodiment, however, is not limited to this. For example, the processes in steps S801 to S805 may be applied in advance to each held texture data in accordance with the assumed observation distance. That is, an appropriate correspondence table of texture data according to the observation distances may be held in advance in the storage unit 302, and the appropriate texture data may be selected in accordance with the observation distance acquired in step S603 with reference to the correspondence table. This can omit part of the processing of selecting the texture data, thereby shortening the processing time. Then, as described above, the appropriate texture data may be selected in accordance with, not the value indicating the observation distance, but the sheet size input by the user or the length of the short or long side of the sheet size input by the user. Note that, for example, if the long side of the sheet size input by the user is long, the observation distance is considered to be long, and if the long side of the sheet size input by the user is short, the observation distance is considered to be short.

Referring back to FIG. 6, in step S605, the CPU 310 functions as the texture data application unit 405 to apply the texture data selected by the texture data selection unit 404 to the decoration target region set by the target region setting unit 401, thereby creating decoration data having undergone gold and silver decoration. Then, the decoration data is output to the output control unit 406.

Figure 9:
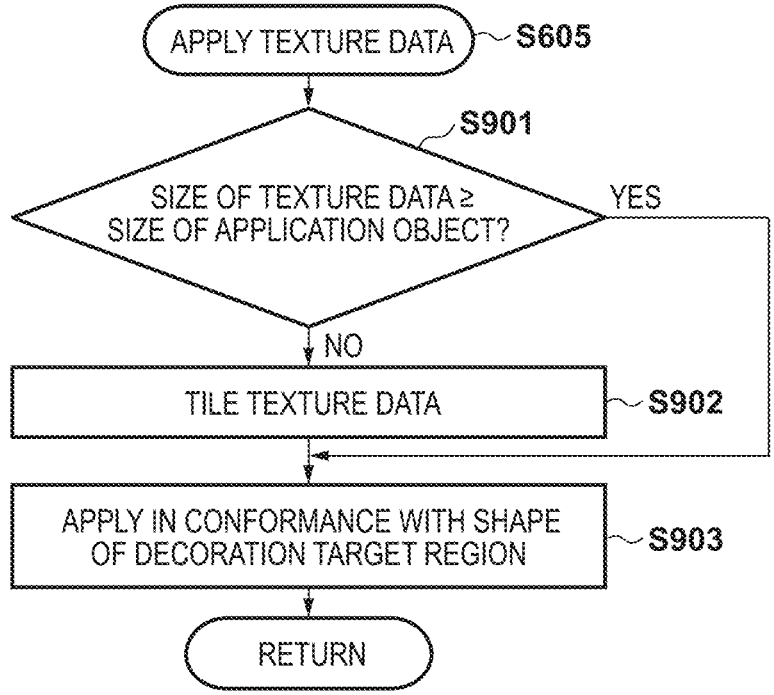
FIG. 9 is a flowchart for explaining details of texture data application processing in step S605.

FIG. 9 is a flowchart for explaining details of the texture data application processing in step S605.

In step S901, the CPU 310 determines whether the size of the texture data selected in step S604 is equal to or larger than the size of the application object. If it is determined that the size of the texture data is equal to or larger than the size of the application object, the process advances to step S903. Otherwise, the process advances to step S902. The comparison between the sizes indicates comparison between each of the long and short sides of the texture data and each of the long and short sides of the application object. If the size of the texture data is smaller than that of the application object with respect to at least one of the long and short sides, the process advances to step S902.

Figure 10A:
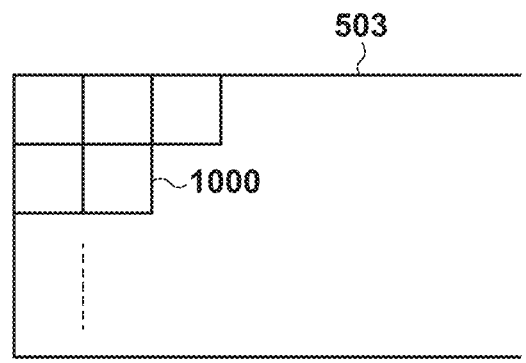
FIG. 10A is a view for explaining tiling of texture data.

In step S902, the CPU 310 tiles the texture data 1000, as shown in FIG. 10A. This tiling processing is performed until the size of each of the short and long sides of the tiled texture data becomes equal to or larger than the size of each of the short and long sides of the application object 503. When performing the tiling processing, tiling may be performed so that the texture data do not overlap each other or the texture data are allowed to overlap each other to some extent.

In step S903, the CPU 310 aligns the texture data acquired in step S901 or S902 with the application object, and then clips the texture data in conformance with the shape of the decoration target region. The thus clipped texture data is superimposed on the decoration target region or the decoration target region is replaced by the clipped texture data, thereby applying gold and silver decoration.

As an example of the method of aligning the texture data with the application object is a method of performing alignment with reference to the upper left positions of the texture data and the application object. Alignment need not be performed with reference to the upper left positions, as a matter of course. That is, alignment need only be performed so that the texture data exists in the entire decoration target region. Then, the aligned texture data is clipped in conformance with the shape of the decoration target region. As the clipping method, for example, a mask image of the decoration target region may be generated using RGB values as thresholds, and applied to the texture data, thereby performing clipping. Furthermore, if the application object is data in the SVG format, the SVG clipPath function may be used.

That is, any method can be used as long as the texture data can be clipped in conformance with the shape of the decoration target region.

In the first embodiment, the example in which the texture data are tiled and used without enlargement or reduction has been explained. However, if a resolution is assumed when designing the texture data, and the resolution is different from that when creating decoration data, the texture data may be enlarged or reduced. For example, if the texture data is created by assuming 300 dpi (dots/inch) and the decoration data is created at 600 dpi, the texture data is enlarged to four times in area, and, then, steps S901 to S903 described above are executed. This can adjust the appearance of the texture data on the decoration data to the appearance when the texture data is created.

Referring back to FIG. 6, in step S606, the CPU 310 functions as the output control unit 406 to perform print control processing for outputting the decoration data created in step S605 from the output apparatus 32.

Figure 10B:
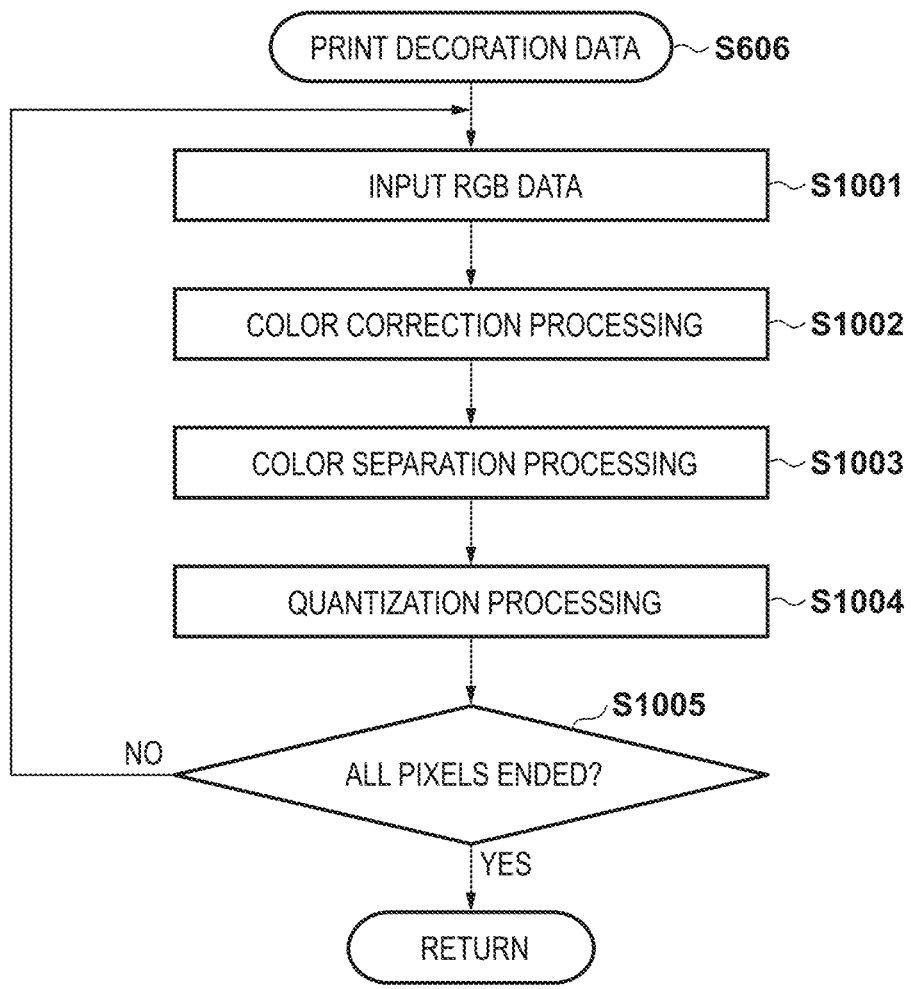
FIG. 10B is a flowchart for explaining decoration data print processing in step S606.

FIG. 10B is a flowchart for explaining the decoration data print processing in step S606.

In step S1001, the CPU 310 inputs an RGB image of the decoration data. The process advances to step S1002, and the CPU 310 performs color correction processing of converting the RGB color of the decoration data into RGB values suitable for printing. As the color correction processing, known preferable processing may be used. The process advances to step S1003, and the CPU 310 performs color separation processing of converting the RGB values into use amounts of inks used by the printheads of the output apparatus 32. As the method of the color separation processing, known preferable processing may be used. As assumed inks, color separation processing into CMYK inks or color separation processing into inks including spot color ink such as metallic ink may be possible.

Next, the process advances to step S1004, and the CPU 310 performs quantization processing of performing conversion into the presence/absence of a dot to be actually printed by the printhead corresponding to each color. As the quantization processing, any method such as known error diffusion processing or dither processing may be used. If the thus quantized dot data is transmitted to the printheads, and preparation of dot data for one scan is complete, actual printing is executed on a sheet using the printheads. In step S1005, the CPU 310 determines whether print processing is complete for all the pixels of the input decoration data. If the print processing is complete, the process ends. Otherwise, the process returns to step S1001 and the remaining decoration data is processed. After that, by repeatedly performing the processes in step S1001 to S1005 until the decoration data print processing ends, the decoration data print processing is performed by the image processing apparatus 30.

According to the first embodiment described above, information concerning an observation distance when observing data having undergone gold and silver decoration is acquired, and texture data presenting high skewness at the observation distance is selected from a plurality of acquired texture data. This can use the texture data having a high luster feeling at the observation distance. That is, it is possible to reproduce metal texture corresponding to the observation distance, thereby suppressing deterioration in decoration effect.

First Modification of First Embodiment

In the above-described first embodiment, the arrangement in which the functional modules 401 to 406 shown in FIG. 4 are implemented in the image processing apparatus 30 has been exemplified. However, some of the functions of the functional modules 401 to 406 may be implemented outside the image processing apparatus, for example, in a processing server 110 shown in FIG. 11A.

Figure 11A:
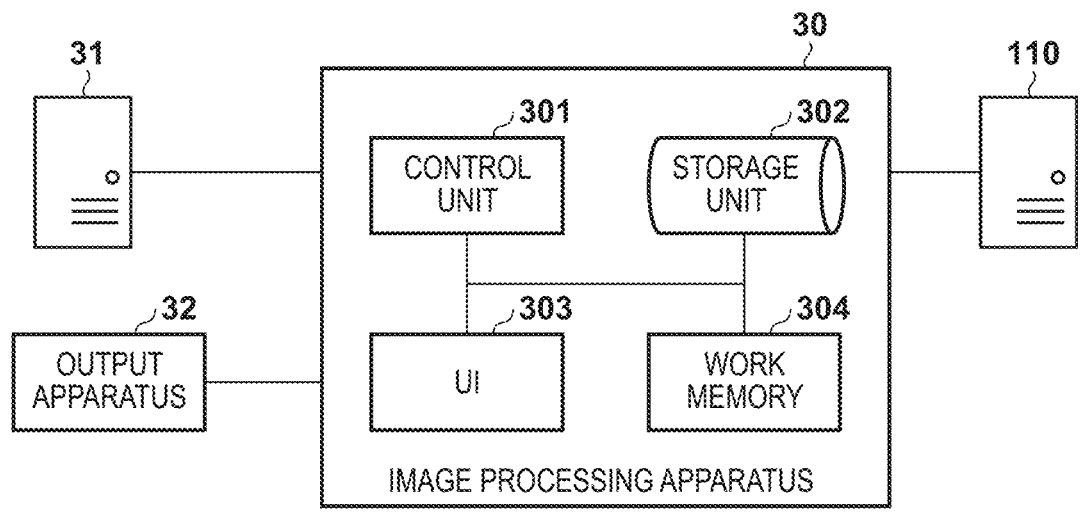
FIG. 11A is a view showing the configuration of an image processing system according to the first modification of the first embodiment of the present invention.

FIG. 11A is a view showing the configuration of an image processing system according to the first modification of the first embodiment of the present invention.

Examples of the processing server 110 are an on-premise physical server and a virtual server configured on a cloud service. The data server 31 may be included in the processing server 110, as a matter of course.

An example when some of the components of the functional blocks are implemented in the processing server 110 will be described with reference to FIG. 11B.

Figure 11B:
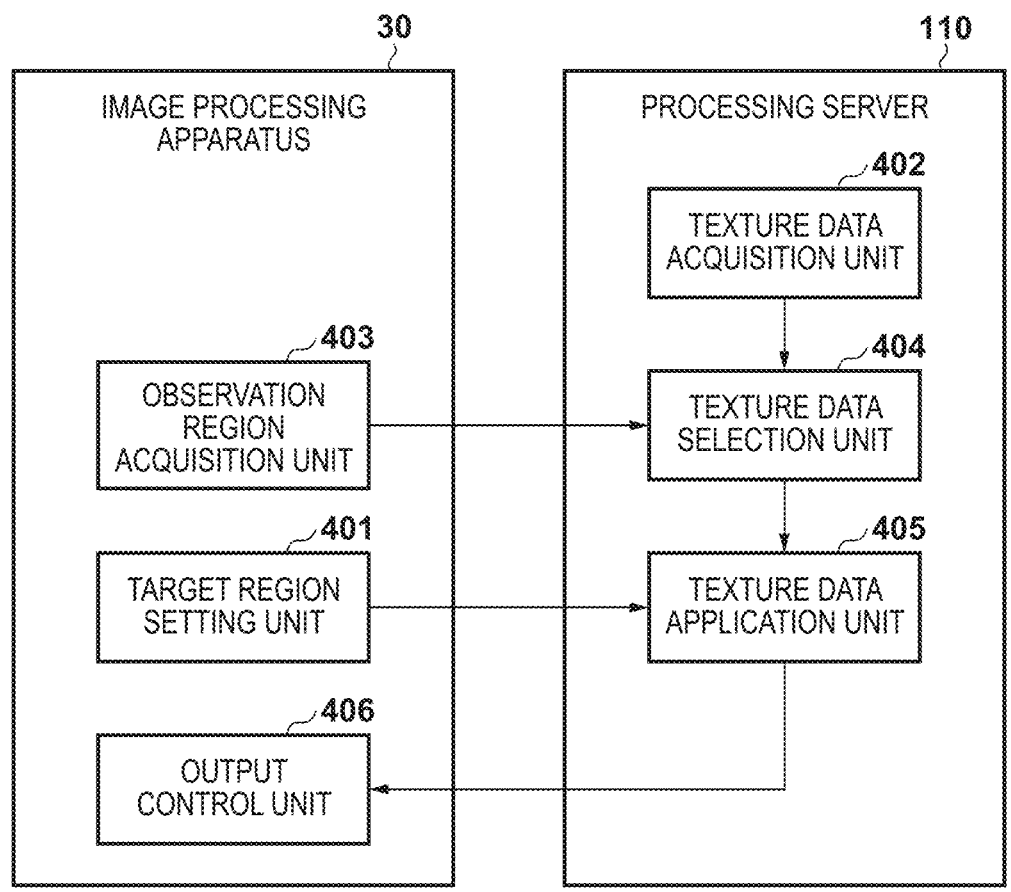
FIG. 11B is a functional block diagram for explaining the functions of a processing server and the image processing apparatus according to the first modification of the first embodiment.

FIG. 11B is a functional block diagram for explaining the functions of the processing server 110 and the image processing apparatus 30 according to the first modification of the first embodiment. Note that the same reference numerals as in FIG. 4 described above denote the same parts and a description thereof will be omitted.

In this image processing system, the target region setting unit 401, the observation distance acquisition unit 403, and the output control unit 406 exist on the image processing apparatus 30, and the texture data acquisition unit 402, the texture data selection unit 404, and the texture data application unit 405 exist on the processing server 110.

In this image processing system, in step S602 of FIG. 6 described above, for example, the texture data acquisition unit 402 of the processing server 110 receives the information of the texture pattern selected in the texture pattern display region 505, thereby acquiring the corresponding texture data. In steps S601 and S603, the acquired decoration target region and the information concerning the observation distance are output to the texture data application unit 405 and the texture data selection unit 404 on the processing server 110, respectively, and the processing server 110 executes steps S604 and S605. In step S606, the output control unit 406 of the image processing apparatus 30 receives the decoration data created in step S605, and the image processing apparatus 30 performs print control.

The method of implementing the components of the functional blocks in the image processing apparatus 30 and the processing server 110 is not limited to this. The texture data acquisition unit 402 and the texture data selection unit 404 may be implemented on the image processing apparatus 30, and the selected texture data may be output to the texture data application unit 405 of the processing server 110.

According to the first modification of the first embodiment, if the capacity of the decoration data is very large (for example, the decoration data is of the A0 size), some of the components of the functional blocks with high processing loads are implemented in the processing server having processing capability higher than the image processing apparatus, thereby making it possible to speed up the processing. In addition, since only the functional blocks with low processing loads can be implemented in the image processing apparatus 30, the processing capability of the image processing apparatus 30 may be made lower than that of the processing server 110. That is, an operation using the image processing apparatus such as a smartphone or a tablet terminal can be performed, thereby facilitating creation of decoration data by a remote operation.

Second Modification of First Embodiment

The above embodiment has explained the example of creating decoration data to be output to the inkjet printer. To the contrary, when the created decoration data is displayed, that is, preview-displayed on the display, the texture data may be switched in accordance with the observation distance set in the observation distance input box 507. In addition to the observation distance of the printed decoration data set in the observation distance input box 507, an observation distance when observing the preview display displayed on the display may be set. In this case, with respect to the decoration data for preview display, the texture data may be switched in accordance with the set observation distance for the preview display. This makes it possible to create decoration data while confirming metal texture reproduced in the texture data after printing.

As the texture data used for decoration data for preview display, texture data having a resolution different from that of the decoration data to be printed may be used. For example, when comparing the resolution of the display for performing preview display with the resolution of the output apparatus such as an inkjet printer, the resolution of the display is often lower. Therefore, with respect to the decoration data for preview display, even if texture data having a resolution lower than that of the texture data used for decoration data to be printed is used, it may be possible to provide sufficient image quality. As described above, by switching the texture data to be used at the time of printing or previewing, the processing load is reduced, thereby making it possible to speed up the processing. Furthermore, by switching the decoration data at the time of previewing or printing, metal texture of the decoration region seen at the time of preview display can be made close to the impression given when seeing the actual print product at an appropriate observation distance.

Second Embodiment

In the above-described first embodiment, appropriate texture data is selected from a plurality of acquire texture data in accordance with an observation distance, and used for decoration processing. To the contrary, an image processing apparatus according to the second embodiment acquires an illumination pattern in addition to texture data, composites the acquired illumination pattern with the texture data, and then uses the thus obtained data for decoration processing. The obtained decoration data is output to an output apparatus. An arrangement and processing according to the second embodiment will be described with reference to FIGS. 12 to 16. Note that a system configuration, the hardware arrangement of an image processing apparatus 30, and the like according to the second embodiment are the same as those in the above-described first embodiment and a description thereof will be omitted.

An illumination pattern indicates a gradation pattern obtained by simulating the intensity distribution of a reflected light component when texture data is illuminated.

Figure 12:
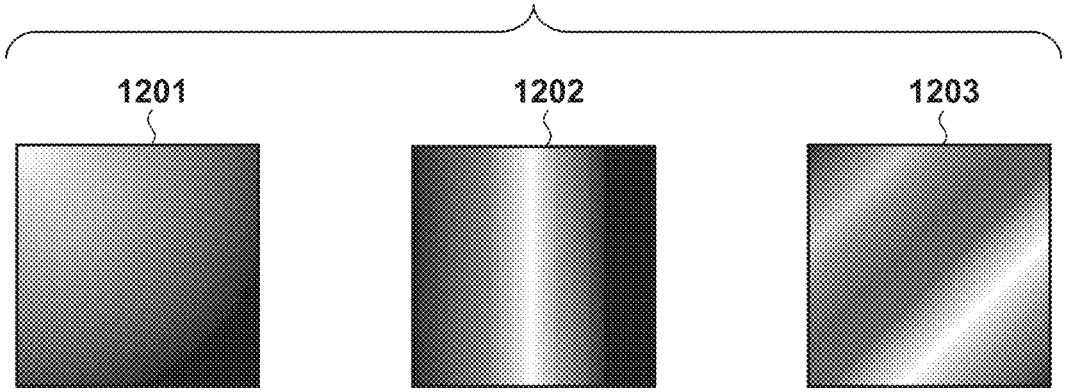
FIG. 12 is a view for explaining illumination patterns according to the second embodiment of the present invention.

FIG. 12 is a view for explaining illumination patterns according to the second embodiment of the present invention.

A region represented by white indicates a region that is illuminated to reflect strongly, and a region represented by black indicates a shadow region. For example, an illumination pattern 1201 is an illumination pattern assuming a status in which it is illuminated from the upper left side. An illumination pattern 1202 is a pattern in which reflected light in the vertical direction is expressed strongly, and recalls a status in which an object having a columnar shape is illuminated. An illumination pattern 1203 includes two strong reflected light components and recalls a shape more complicated than the illumination pattern 1202. The variations of the illumination patterns are not limited to them. By assuming that the illumination pattern is applied to decoration data, variations may be held to be switched in accordance with the shape of an application object. When, for example, decoration processing is performed for text, if a strong reflection component is composited near a character outline, recognizability may deteriorate, and thus an illumination pattern in which the brightness near the character outline is suppressed may be held. By making a contrivance to the illumination pattern, the luster feeling by reflected light can be reproduced without degrading the recognizability of a decoration target region. The form of the illumination pattern may be vector data or raster data.

In the second embodiment, the above-described illumination pattern is held in addition to texture data, and composited with the texture data in processing (to be described later), thereby making it possible to reproduce reflected light in accordance with illumination light and a virtual shape. That is, it is possible to reproduce more realistic metal texture. The configuration of an image processing system to which the image processing apparatus according to the second embodiment is applied is the same as that according to the above-described first embodiment, and a description thereof will be omitted.

Figure 13:
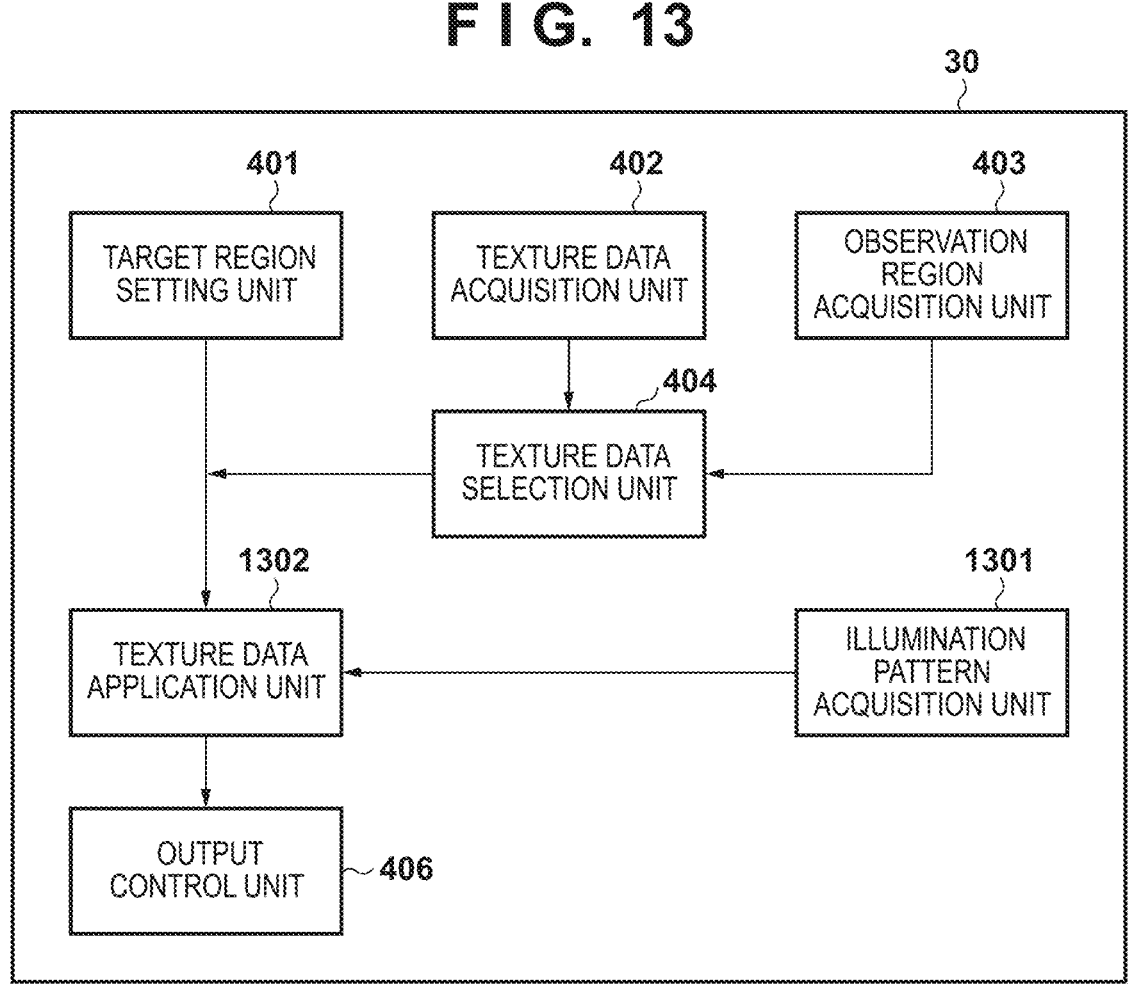
FIG. 13 is a functional block diagram for explaining the functions of an image processing apparatus according to the second embodiment of the present invention.

FIG. 13 is a functional block diagram for explaining the functions of the image processing apparatus 30 according to the second embodiment of the present invention. The functions of a target region setting unit 401, a texture data acquisition unit 402, an observation distance acquisition unit 403, a texture data selection unit 404, and an output control unit 406 according to the second embodiment are the same as those in the above-described first embodiment and a description thereof will be omitted. Only parts different from FIG. 4 will be described below.

An illumination pattern acquisition unit 1301 acquires an illumination pattern input from a data server 31 to the image processing apparatus 30. A texture data application unit 1302 composites the illumination pattern with texture data selected by the texture data selection unit 404 and arranges the thus obtained data in an application region, thereby creating decoration data.

FIG. 14 is a flowchart for explaining processing executed by the image processing apparatus 30 according to the second embodiment. In steps S1401, S1402, S1404, S1405, and S1407, the same processes as those in steps S601, S602, S603, S604, and S606 of FIG. 6 in the first embodiment are executed, respectively, and a description thereof will be omitted. Only portions different from the flowchart shown in FIG. 6 will be described.

In step S1403, a CPU 310 functions as the illumination pattern acquisition unit 1301 to acquire an illumination pattern input from the data server 31 to the image processing apparatus 30. Then, the acquired illumination pattern is output to the texture data application unit 1302.

Figure 15A:
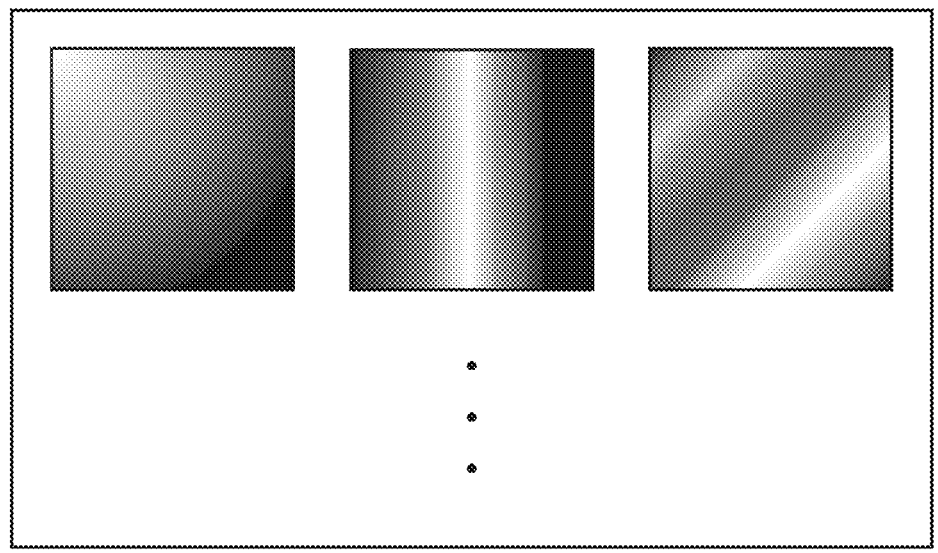
FIG. 15A is a view showing examples of the illumination pattern of a UI according to the second embodiment.

As for this illumination pattern, for example, an illumination pattern selection list shown in FIG. 15A may be provided on a UI 303, and an illumination pattern selected by the user may be acquired. Alternatively, an illumination pattern setting bar (not shown) for designating start and end points and intensity values at the start and end points may be provided to dynamically generate a gradation pattern, and the gradation pattern may be used as the illumination pattern. By dynamically generating a pattern, fine control can be executed in accordance with the preference of the user. Alternatively, without providing the illumination pattern selection list or the illumination pattern setting bar on the UI 303, an illumination pattern associated with each of the texture data displayed in the texture pattern display region (or texture pattern selection list) 505 may be acquired. This can automatically select an illumination pattern appropriate for texture data without requiring the user's labor of selecting the illumination pattern.

Note that the second embodiment has explained the example of acquiring the illumination pattern directly from the data server 31, but an illumination pattern stored in advance in a storage unit 302 may be acquired, as a matter of course.

In step S1406, the CPU 310 functions as the texture data application unit 1302 to composite the illumination pattern acquired by the illumination pattern acquisition unit 1301 with the texture data selected by the texture data selection unit 404. The thus composited texture data is applied to the decoration target region set by the target region setting unit 401, thereby creating decoration data having undergone gold and silver decoration. Then, the decoration data is output to the output control unit 406.

Figure 15B:
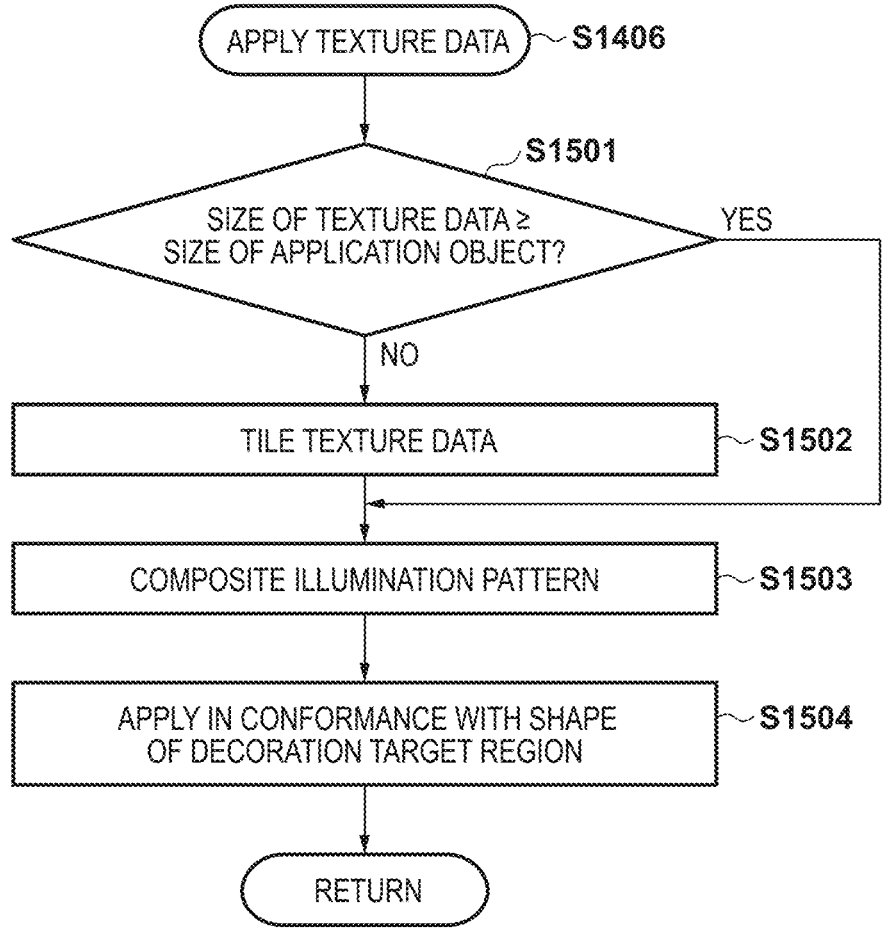
FIG. 15B is a flowchart for explaining details of texture data application processing in step S1406.

FIG. 15B is a flowchart for explaining details of the texture data application processing in step S1406. In steps S1501, S1502, and S1504, the same processes as those in steps S901, S902, and S903 in the first embodiment are executed and a description thereof will be omitted. Only portions different from the flowchart shown in FIG. 9 will be described below.

In step S1503, the illumination pattern is composited with the texture data acquired in step S1501 or S1502.

FIG. 16 is a view for explaining an outline of the processing in step S1503.

First, magnification processing is applied to the illumination pattern in accordance with the size of the texture data. For the magnification processing, a known technique can be used, and an example is magnification processing using bicubic interpolation or bilinear interpolation. When the illumination pattern is magnified in accordance with the size of the texture data and used, it is possible to control the luster feeling in accordance with the size of the texture data.

Next, composition processing is performed by aligning the texture data with the illumination pattern applied with the magnification processing. As the processing of performing alignment, the method described in step S903 of FIG. 9 can be used. As the composition processing, known layer composition processing can be used. For example, the texture data and the illumination pattern can be composited by layer composition processing such as soft light or an overlay. As described above, the processing of the image processing apparatus 30 according to the second embodiment is performed.

As described above, according to the second embodiment, by acquiring the illumination pattern and compositing it with the selected texture data, it is possible to reproduce a high specular reflection characteristic as the characteristic of metal. That is, it is possible to create decoration data that reproduces more realistic metal texture. Furthermore, by separately holding the texture data and the illumination pattern, magnifying the illumination pattern in accordance with the size of the decoration target region, and then compositing the illumination pattern with the texture data, it is possible to reproduce metal texture having almost the same impression to a decoration target region of a different size.

Third Embodiment

In the above-described embodiment, appropriate texture data is selected from a plurality of acquired texture data in accordance with an observation distance and used for decoration processing. To the contrary, an image processing apparatus according to the third embodiment acquires one texture data, corrects it in accordance with the observation distance of decoration data, and uses the thus obtained data for decoration processing. The obtained decoration data is output to an output apparatus. An arrangement and processing according to the third embodiment will be described below with reference to FIGS. 17 to 20. Note that the configuration of an image processing system to which the image processing apparatus according to the third embodiment is applied is the same as that according to the first embodiment and a description thereof will be omitted.

Figure 17:
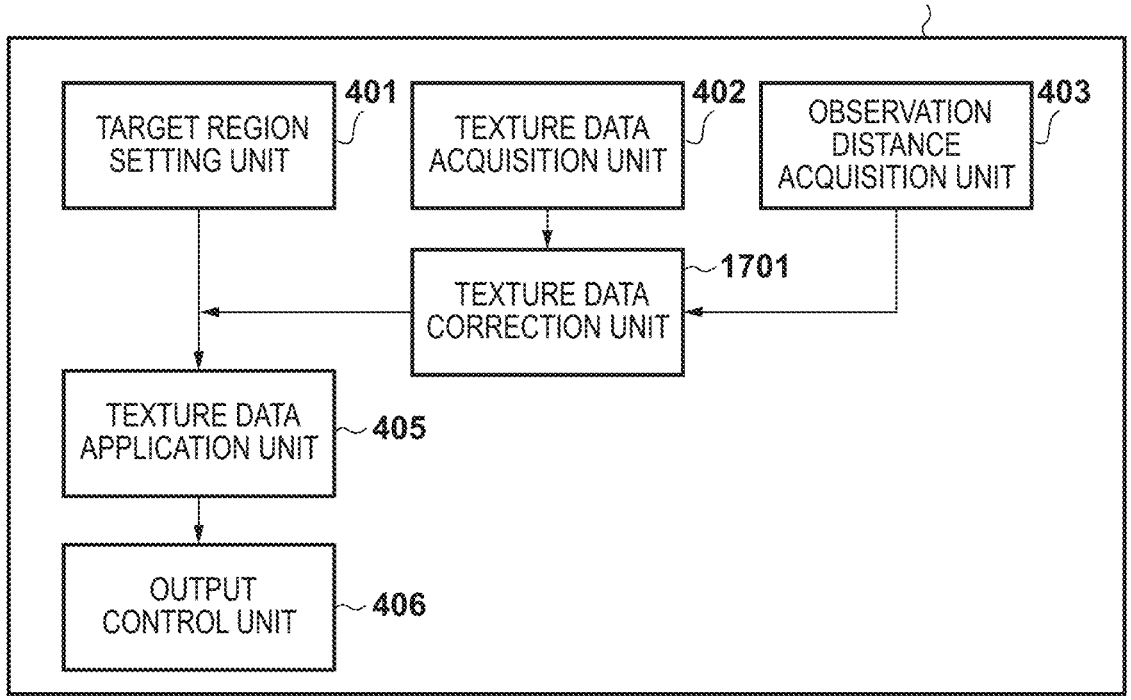
FIG. 17 is a functional block diagram for explaining the functions of an image processing apparatus 30 according to the third embodiment.

FIG. 17 is a functional block diagram for explaining the functions of an image processing apparatus 30 according to the third embodiment. Note that, in FIG. 17, the same reference numerals as in FIG. 4 described above denote the same parts and a description thereof will be omitted. Only parts different from FIG. 4 will be described below.

A texture data correction unit 1701 corrects, based on information concerning an observation distance acquired by an observation distance acquisition unit 403, texture data acquired by a texture data acquisition unit 402 so that metal texture perceived when an observer observes, at the observation distance, a print product on which the texture data is printed becomes high, when the distance between the print product and the observer observing the print product is the observation distance.

Figure 18:
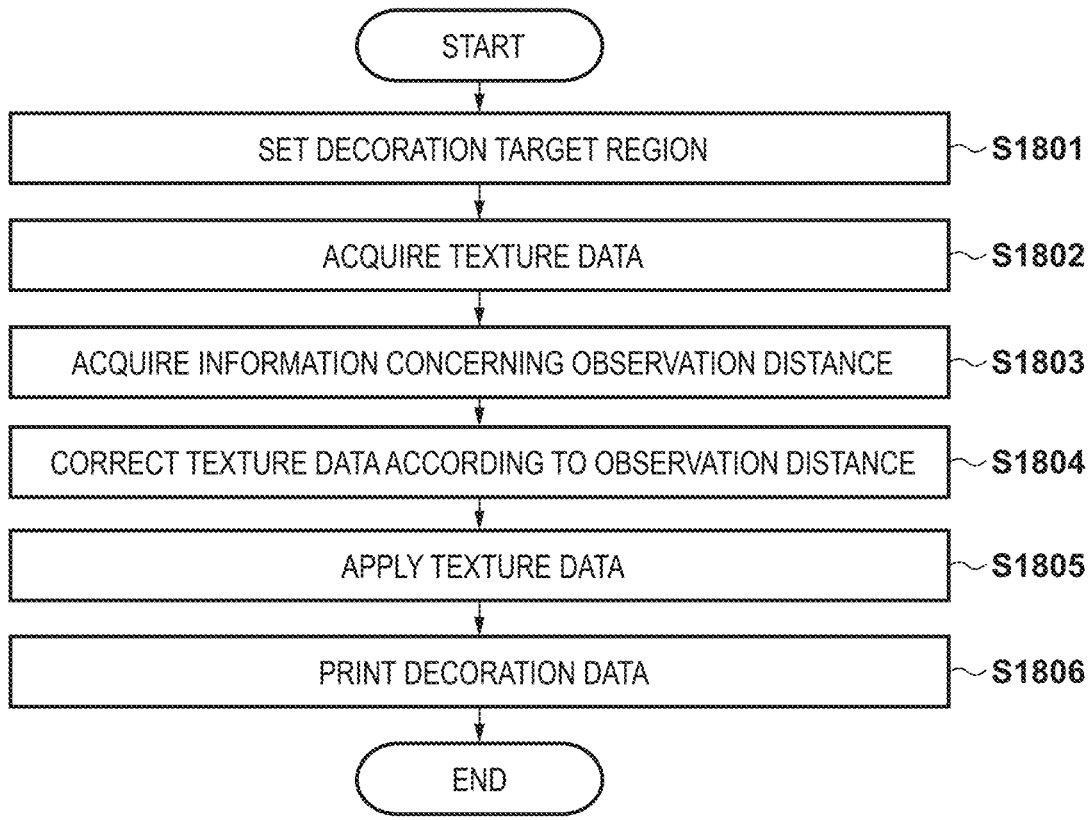
FIG. 18 is a flowchart for explaining processing executed by the image processing apparatus according to the third embodiment.

FIG. 18 is a flowchart for explaining processing executed by the image processing apparatus 30 according to the third embodiment. Note that, in steps S1801, S1803, S1805, and S1806 of FIG. 18, the same processes as those in steps S601, S603, S605, and S606 of FIG. 6 in the first embodiment are executed and a description thereof will be omitted. Only portions different from the flowchart shown in FIG. 6 will be described below.

In step S1802, a CPU 310 functions as the texture data acquisition unit 402 to acquire texture data input from a data server 31 to the image processing apparatus 30. Then, the acquired texture data is output to the texture data correction unit 1701. More specifically, the user acquires one texture data associated with a texture pattern selected in the texture pattern display region (or texture pattern selection list) 505 on a UI 303 in FIG. 5. In the third embodiment, an example in which texture data is acquired directly from the data server 31 has been explained. However, texture data acquired in advance in a storage unit 302 may be acquired, as a matter of course.

In step S1804, the CPU 310 functions as the texture data correction unit 1701 to correct the texture data acquired by the texture data acquisition unit 402 so that the skewness of a luminance histogram in perceived luminance contrast data becomes high, based on the information concerning the observation distance acquired by the observation distance acquisition unit 403. Then, in step S1805, the CPU 310 outputs the corrected texture data to a texture data application unit 405.

Figure 19:
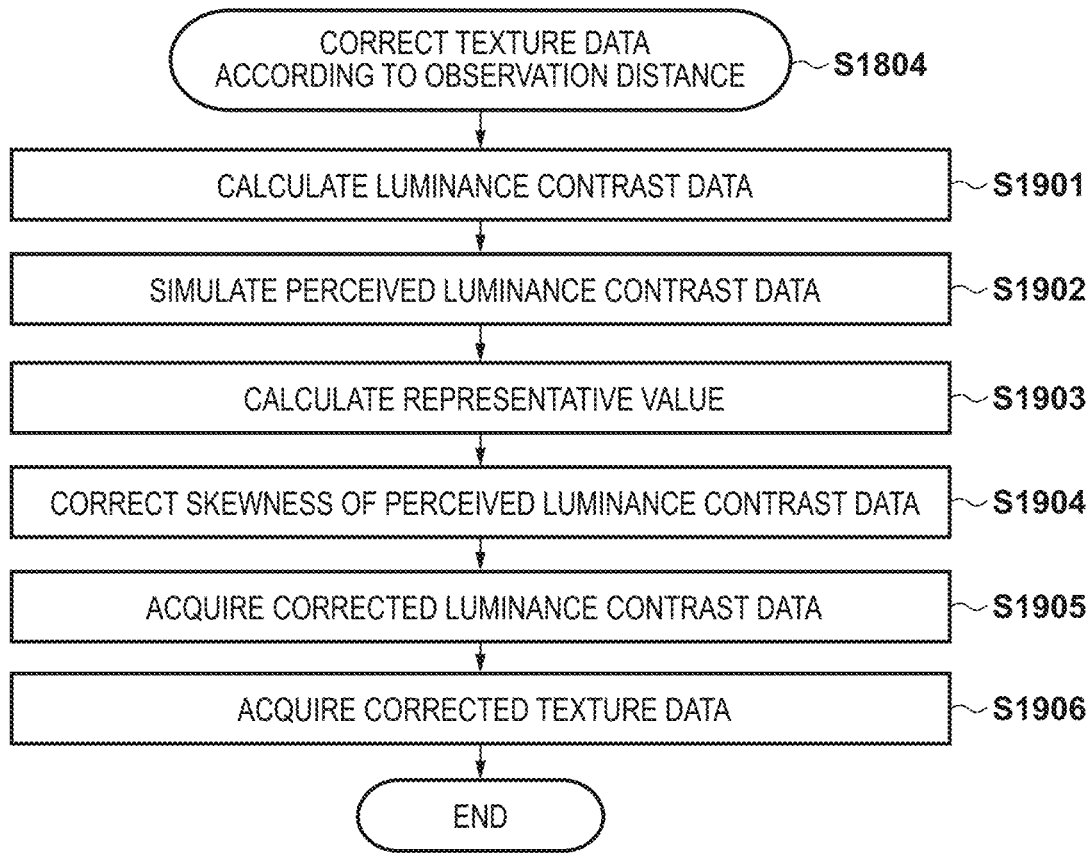
FIG. 19 is a flowchart for explaining an example of texture data correction processing according to an observation distance in step S1804.

FIG. 19 is a flowchart for explaining an example of texture data correction processing according to the observation distance in step S1804. In steps S1901 and S1902, the same processes as those in steps S801 and S802 of FIG. 8 described above are executed and a description thereof will be omitted.

In step S1903, the CPU 310 calculates a representative value in the perceived luminance contrast data calculated in step S1901. The representative value is, for example, a mode or an average value.

Figure 20:
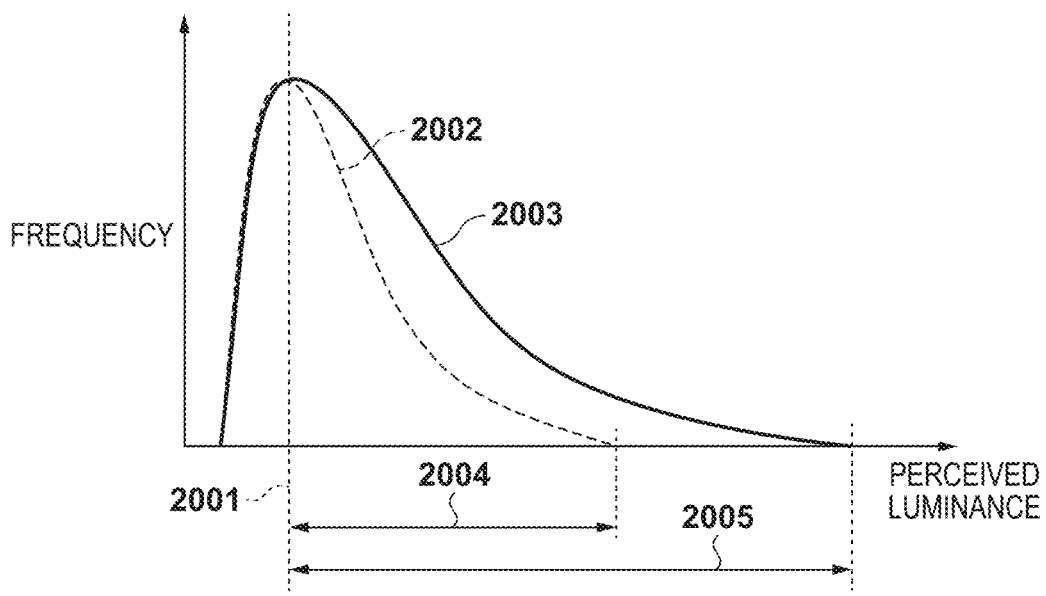
FIG. 20 is a graph for explaining an example of calculating a representative value according to the third embodiment.

FIG. 20 is a graph for explaining an example of calculating the representative value according to the third embodiment.

The representative value is a mode 2001. A histogram 2002 indicates the histogram of the perceived luminance contrast data.

In step S1904, the CPU 310 corrects a pixel value equal to or greater than the mode 2001 (representative value) calculated in step S1903. More specifically, correction is performed so that the mode 2001 and a maximum dynamic range 2004 of the histogram 2002 of the perceived luminance contrast data become larger. Note that the maximum dynamic range 2004 is a range of the histogram of the mode 2001 or more. For example, correction is performed so that the maximum value of the perceived luminance contrast data is the maximum value that can be taken by the perceived luminance contrast data. This correction method may multiply, by a positive coefficient, a pixel value equal to or greater than the mode included in the perceived luminance contrast data. Alternatively, known histogram planarization processing may be used to perform processing for the pixel value included in the dynamic range 2004 so that the dynamic range becomes large.

A histogram 2003 shown in FIG. 20 is an example of a histogram after correction. In the histogram 2003, a maximum dynamic range 2005 with respect to the mode (representative value) 2001 is larger than the dynamic range 2004 before correction. That is, the unevenness of the histogram is larger and it can thus be said that the skewness is larger.

In step S1905, the CPU 310 cancels the change in contrast perceived by the frequency response characteristic of vision from the corrected perceived luminance contrast data, thereby performing conversion into luminance contrast data after skewness correction. In step S1902, the luminance contrast data is converted into frequency data and multiplied by the frequency response characteristic of vision at the observation distance, thereby simulating the perceived data. Therefore, in step S1905, the corrected perceived luminance contrast data is divided by the frequency response characteristic of vision at the observation distance on the frequency domain, thereby acquiring the corrected luminance contrast data.

The process advances to step S1906 and the CPU 310 replaces the luminance contrast data of the texture data input in step S1901 by the corrected luminance contrast data acquired in step S1905. Thus, the texture data after skewness correction is acquired. A method of converting YCbCr data into RGB data can perform conversion using equations (7) to (9) below.

$$R = Y + 1.402 \cdot Cr \quad (7)$$

$$G = Y - 0.344 \cdot Cb - 0.714 \cdot Cr \quad (8)$$

$$B = Y + 1.772 \cdot Cb \quad (9)$$

By performing the correction processing for the texture data, as described above, correction can be performed so that the skewness of the perceived luminance contrast data at the observation distance of the decoration data becomes high.

Note that the method of correcting the texture data is not limited to the above-described one. For example, the texture data may be corrected by magnification processing. Alternatively, if an observation distance is assumed when designing the texture data, an assumed observation distance L0 is held in the data server 31 or the storage unit 302 in association with the texture data. If, for example, the display observation distance when designing the texture data is 60 cm and the texture data is designed so that metal texture is high under this condition, the assumed observation distance L0 is set to 60 cm. Then, in step S1802 of FIG. 18, the assumed observation distance L0 is acquired in addition to the texture data. Then, in step S1906, a magnification M is decided based on the ratio between the assumed observation distance L0 and an observation distance L input to the observation distance input box 507, by:

$$M = L/L0 \quad (10)$$

The texture data is enlarged or reduced based on the thus calculated magnification M. By performing magnification processing of the texture data, as described above, the appearance of the texture data on the decoration data can be adjusted to the appearance when creating the texture data. That is, correction can be performed so that the skewness of the luminance histogram of the perceived luminance contrast data of the decoration data corresponding to the actual observation distance is almost equal to the skewness of the perceived luminance contrast data corresponding to the observation distance when creating the texture data. Note that the method of the texture data correction processing is not limited to the above-described one and any correction method can be used as long as the skewness of the luminance histogram of the perceived luminance contrast data perceived when the observer observes, at the observation distance, a print product on which the texture data is printed is high. As described above, the processing of the image processing apparatus 30 according to the third embodiment is executed.

As described above, according to the third embodiment, reference texture data acquired in advance is corrected so that the skewness of a luminance histogram becomes high in an image perceived when an observer observes, at an observation distance, a print product on which the texture data is printed, and is then used. This can generate texture data having a high luster feeling when performing observation at the observation distance. That is, it is possible to create decoration data having high metal texture. Furthermore, since the reference texture data need only be held, it is possible to perform processing by saving a memory, as compared with a case in which a plurality of texture data are held.

The above third embodiment has explained the example in which texture data is created by correcting acquired texture data so that the skewness of a luminance histogram becomes high in an image perceived when an observer observes, at an observation distance, a print product on which the texture data is printed. In the third embodiment as well, an illumination pattern may be held separately from the texture data, and composited with the corrected texture data, similar to the second embodiment. This can reproduce a high specular reflection characteristic as the characteristic of metal, thereby creating decoration data that reproduces more realistic metal texture.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing method of holding a plurality of texture data for applying a metal representation on an image, the method comprising:
   acquiring predetermined information concerning at least one of an observation distance as a distance between a print product on which a target region is printed and an observer observing the print product, a sheet on which the target region is product, or an environment in which the print product is observed;
   selecting texture data from the plurality of texture data based on the acquired predetermined information; and
   applying, to the target region, the texture data selected in the selecting.

2. The method according to claim 1, wherein texture data is selected from the plurality of texture data based on skewness of a histogram of luminance contrast data perceived when the observer observes the texture data at the observation distance based on the acquired predetermined information.

3. The method according to claim 1, wherein, in the selecting, texture data is selected such that skewness of a histogram of luminance contrast data perceived when the observer observes, at the observation distance corresponding to the acquired predetermined information, the print product, on which the texture data is printed, indicates a positive value.

4. The method according to claim 1, wherein, in the selecting, texture data is selected such that skewness of a histogram of luminance contrast data perceived when the observer observes, at the observation distance corresponding to the acquired predetermined information, a print product, on which the target region applied with the texture data is printed, is highest.

5. The method according to claim 1, further comprising acquiring reference texture data from the plurality of texture data,
   wherein, in the selecting, texture data is selected such that skewness of a histogram of luminance contrast data perceived when the observer observes, at the observation distance corresponding to the acquired predetermined information, a print product, on which the target region applied with the texture data is printed, is higher than skewness of a histogram of luminance contrast data perceived when the observer observes, at the observation distance corresponding to the acquired predetermined information, a print product, on which the target region applied with the reference texture data, is printed.

6. The method according to claim 5, wherein, in the selecting, texture data, closest in color to the reference texture data, is selected.

7. The method according to claim 6, wherein the color includes at least one of a hue or a chroma.

8. The method according to claim 1, further comprising acquiring an illumination pattern,
   wherein, in the applying, the texture data, selected in the selecting, is composited with the illumination pattern, and applied to the target region.

9. The method according to claim 8, wherein, in the applying, the illumination pattern is magnified in accordance with a size of the texture data selected in the selecting, the magnified illumination pattern and the texture data are aligned and composited, and then, the texture data is applied to the target region.

10. The method according to claim 1, wherein information concerning a sheet, on which the target region is printed, is at least one of information indicating a sheet size used to print decoration data obtained by applying the texture data to the target region or information indicating a length of one of a short side and a long side of the sheet size used to print the decoration data obtained by applying the texture data to the target region.

11. The method according to claim 1, wherein luminance contrast data perceived when the observer observes the texture data at the observation distance based on the acquired predetermined information is obtained by converting the texture data into luminance contrast data, and, inversely converting, into the luminance contrast data, frequency data of the luminance contrast data obtained by multiplying a frequency based on a pixel count of the texture data and a size after printing by a frequency response characteristic of vision corresponding to the observation distance.

12. The method according to claim 1, further comprising outputting an image including the target region applied with the textured data in the applying.

13. An image processing method of holding a plurality of texture data for applying a metal representation on an image, the method comprising:
   setting a target region to which the metal representation on the image is applied;
   acquiring one texture data;
   acquiring predetermined information concerning an observation distance as a distance between a print product on which the target region is printed and an observer when observing the print product;
   correcting, based on the acquired predetermined information, the texture data acquired in the acquiring the one texture data; and
   applying, to the target region, the texture data corrected in the correcting.

14. The method according to claim 13, wherein the texture data acquired in the acquiring the one texture data is corrected so that skewness of a histogram of luminance contrast data perceived when observing, at the observation distance based on the acquired predetermined information, the print product, on which the target region applied with the texture data is printed, becomes large.

15. The method according to claim 14, further comprising acquiring information concerning an assumed observation distance as an observation distance assumed when the texture data is designed,
wherein, in the correcting, the texture data is magnified based on a ratio between the observation distance and the assumed observation distance.

16. The method according to claim 14, further comprising acquiring an illumination pattern,
wherein, in the applying, the texture data corrected in the correcting is composited with the illumination pattern, and applied to the target region.

17. The method according to claim 16, wherein, in the applying, the illumination pattern is magnified in accordance with a size of the texture data corrected in the correcting, the magnified illumination pattern and the texture data are aligned and composited, and then, the texture data is applied to the target region.

18. The method according to claim 13, wherein, in the correcting, correction is performed so as to increase a histogram dynamic range not less than a representative value of a histogram of luminance contrast data perceived when the observer observes the texture data at the observation distance corresponding to the acquired predetermined information.

19. The method according to claim 18, wherein the representative value is one of an average value and a mode of the luminance contrast data.

20. The method according to claim 13, wherein information concerning a sheet, on which the target region is printed, is at least one of information indicating a sheet size used to print decoration data obtained by applying the texture data to the target region or information indicating a length of one of a short side and a long side of the sheet size used to print the decoration data obtained by applying the texture data to the target region.

21. The method according to claim 13, wherein luminance contrast data perceived when the observer observes the texture data at the observation distance based on the acquired predetermined information is obtained by converting the texture data into luminance contrast data, and, inversely converting, into the luminance contrast data, frequency data of the luminance contrast data obtained by multiplying a frequency based on a pixel count of the texture data and a size after printing by a frequency response characteristic of vision corresponding to the observation distance.

22. The method according to claim 13, further comprising outputting an image including the target region applied with the textured data in the applying.

23. An image processing apparatus for holding a plurality of texture data for applying a metal representation on an image, the apparatus comprising:
one or more processors; and
a memory storing instructions that, when executed by the one or more processors, causes the image processing apparatus to function as:
an acquisition unit configured to acquire predetermined information concerning at least one of an observation distance as a distance between a print product on which a target region is printed and an observer observing the print product, a sheet on which the target region is product, or an environment in which the print product is observed;
a selection unit configured to select texture data from the plurality of texture data based on the acquired predetermined information; and
an application unit configured to apply, to the target region, the texture data selected by the selection unit.

24. An image processing apparatus, the apparatus comprising:
one or more processors; and
a memory storing instructions that, when executed by the one or more processors, causes the image processing apparatus to function as:
a setting unit configured to set a target region to which a metal representation on an image is applied;
a first acquisition unit configured to acquire one texture data;
a second acquisition unit configured to acquire predetermined information concerning an observation distance as a distance between a print product on which the target region is printed and an observer when observing the print product;
a correction unit configured to correct, based on the acquired predetermined information, the texture data acquired by the first acquisition unit; and
an application unit configured to apply, to the target region, the texture data corrected by the correction unit.

* * * * *